(12) United States Patent
Malak et al.

(10) Patent No.: US 10,885,056 B2
(45) Date of Patent: Jan. 5, 2021

(54) DATA STANDARDIZATION TECHNIQUES

(71) Applicant: Oracle International Corporation, Redwood Shores, CA (US)

(72) Inventors: Michael Malak, Denver, CO (US); Luis E. Rivas, Denver, CO (US); Mark L. Kreider, Arvada, CO (US); Philip Ogren, Boulder, CO (US); Robert James Oberbreckling, Boulder, CO (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 221 days.

(21) Appl. No.: 16/141,244

(22) Filed: Sep. 25, 2018

(65) Prior Publication Data

US 2019/0102441 A1    Apr. 4, 2019

Related U.S. Application Data

(60) Provisional application No. 62/566,123, filed on Sep. 29, 2017.

(51) Int. Cl.
*G06F 16/00* (2019.01)
*G06F 16/25* (2019.01)
(Continued)

(52) U.S. Cl.
CPC .......... *G06F 16/258* (2019.01); *G06F 16/285* (2019.01); *G06F 16/90344* (2019.01);
(Continued)

(58) Field of Classification Search
None
See application file for complete search history.

(56) References Cited

U.S. PATENT DOCUMENTS

| 6,047,283 A | 4/2000 | Braun |
| 6,556,983 B1 | 4/2003 | Altschuler et al. |

(Continued)

FOREIGN PATENT DOCUMENTS

| CN | 106687952 | 5/2017 |
| CN | 106796595 | 5/2017 |

(Continued)

OTHER PUBLICATIONS

Apache Tika—a Content Analysis Toolkit, The ApacheSoftware Foundation, Available Online at: http://tika.apache.org/, Dec. 23, 2015, 9 pages.

(Continued)

*Primary Examiner* — Bai D Vu
(74) *Attorney, Agent, or Firm* — Kilpatrick Townsend & Stockton LLP

(57) ABSTRACT

Techniques are disclosed for standardization of data. According to a first technique, standard representation terms are determined for to-be-standardized data using the to-be-standardized data itself and without using any external reference data. According to a second technique, a combination of the to-be-standardized data and an external reference is used to determine standard representation terms for the to-be-standardized data.

29 Claims, 12 Drawing Sheets

(51) Int. Cl.
*G06K 9/62* (2006.01)
*G06F 16/28* (2019.01)
*G06F 16/903* (2019.01)

(52) U.S. Cl.
CPC .......... *G06K 9/622* (2013.01); *G06K 9/6215* (2013.01); *G06K 9/6228* (2013.01)

(56) References Cited

U.S. PATENT DOCUMENTS

| | | | |
|---|---|---|---|
| 6,807,558 | B1 | 10/2004 | Hassett et al. |
| 7,536,634 | B2 | 5/2009 | Green et al. |
| 7,571,177 | B2 | 8/2009 | Damle |
| 7,856,598 | B2 | 12/2010 | Liao et al. |
| 7,865,358 | B2 | 1/2011 | Green et al. |
| 7,912,907 | B1 | 3/2011 | Mantel et al. |
| 8,155,951 | B2 | 4/2012 | Jamieson |
| 8,199,985 | B2 | 6/2012 | Jakobsson et al. |
| 8,234,285 | B1 | 7/2012 | Cohen |
| 8,296,124 | B1 | 10/2012 | Holsztynska et al. |
| 8,396,859 | B2 | 3/2013 | Green et al. |
| 8,874,616 | B1 | 10/2014 | Coffman et al. |
| 9,070,090 | B2 | 6/2015 | Ogren et al. |
| 9,251,294 | B2 | 2/2016 | Nevidomski et al. |
| 9,489,372 | B2 | 11/2016 | Prilepov et al. |
| 10,210,246 | B2 | 2/2019 | Stojanovic et al. |
| 2002/0107861 | A1 | 8/2002 | Clendinning et al. |
| 2002/0152201 | A1 | 10/2002 | Nanavati et al. |
| 2004/0260695 | A1 | 12/2004 | Brill |
| 2005/0071140 | A1 | 3/2005 | Ben-hur et al. |
| 2005/0137991 | A1 | 6/2005 | Bruce et al. |
| 2005/0278307 | A1 | 12/2005 | Battagin et al. |
| 2006/0004730 | A1 | 1/2006 | Chan |
| 2006/0075021 | A1 | 4/2006 | Sugiyama et al. |
| 2007/0112827 | A1 | 5/2007 | Dettinger et al. |
| 2007/0239679 | A1 | 10/2007 | Wieser et al. |
| 2008/0027929 | A1 | 1/2008 | Rice et al. |
| 2008/0281820 | A1 | 11/2008 | Do et al. |
| 2009/0006460 | A1 | 1/2009 | Kleinberg et al. |
| 2009/0281732 | A1 | 11/2009 | Turnbull |
| 2010/0077011 | A1 | 3/2010 | Green et al. |
| 2010/0131844 | A1 | 5/2010 | Wohlert |
| 2010/0185689 | A1 | 7/2010 | Hu et al. |
| 2010/0205475 | A1 | 8/2010 | Ebrahimi et al. |
| 2010/0274821 | A1 | 10/2010 | Bernstein et al. |
| 2011/0093467 | A1 | 4/2011 | Sharp et al. |
| 2011/0106791 | A1 | 5/2011 | Maim |
| 2011/0106836 | A1 | 5/2011 | Hassanzadeh et al. |
| 2011/0173149 | A1* | 7/2011 | Schon .............. G06F 16/24564 706/48 |
| 2012/0078919 | A1 | 3/2012 | Mineno |
| 2012/0101975 | A1 | 4/2012 | Khosravy |
| 2012/0117076 | A1 | 5/2012 | Austermann |
| 2012/0136859 | A1 | 5/2012 | Shamsi et al. |
| 2012/0166180 | A1 | 6/2012 | Au |
| 2013/0110792 | A1 | 5/2013 | Hudis et al. |
| 2013/0232452 | A1 | 9/2013 | Krajec et al. |
| 2014/0052688 | A1 | 2/2014 | Bansal |
| 2014/0067728 | A1 | 3/2014 | Ogren et al. |
| 2014/0074829 | A1 | 3/2014 | Schmidt |
| 2014/0115155 | A1 | 4/2014 | Bonchi et al. |
| 2014/0222181 | A1 | 8/2014 | Hemenway et al. |
| 2014/0279865 | A1 | 9/2014 | Kumar et al. |
| 2014/0337331 | A1 | 11/2014 | Hassanzadeh et al. |
| 2015/0106324 | A1 | 4/2015 | Puri et al. |
| 2015/0370775 | A1 | 12/2015 | Bauchot |
| 2016/0092090 | A1 | 3/2016 | Stojanovic et al. |
| 2016/0092474 | A1 | 3/2016 | Stojanovic et al. |
| 2016/0092475 | A1 | 3/2016 | Stojanovic et al. |
| 2016/0092476 | A1 | 3/2016 | Stojanovic et al. |
| 2016/0092557 | A1 | 3/2016 | Stojanovic et al. |
| 2016/0188701 | A1 | 6/2016 | Fapohunda |
| 2016/0286544 | A1 | 9/2016 | Ikeda et al. |
| 2017/0220541 | A1 | 8/2017 | Dayama et al. |

FOREIGN PATENT DOCUMENTS

| | | |
|---|---|---|
| EP | 3198482 | 8/2017 |
| EP | 3198484 | 8/2017 |
| JP | 2017534108 | 11/2017 |
| JP | 2017536601 | 12/2017 |
| WO | 9848360 | 10/1998 |
| WO | 2016049437 | 3/2016 |
| WO | 2016049460 | 3/2016 |
| WO | 2016049437 | 3/2017 |

OTHER PUBLICATIONS

Commons Virtual File System, The Apache Software Foundation, Available Online at: http://commons.apache.org/proper/commons-vfs/index.html, Feb. 28, 2014, 2 pages.
Fuzzy String Search, Nikita's blog: Fuzzy string search, Retrieved from the internet:http://ntz-develop.blogspot.com/2011/03/fuzzy-string-search.html, Mar. 24, 2011, 21 pages.
Gensim: Topic Modelling for Humans Xploiting Similarities Among Languages for Machine Translation, Available Online at: https://radimrehurek.com/gensim/, Dec. 23, 2015, 2 pages.
Hadoop MapReduce Next Generation—Writing YARN Applications, Apache Hadoop 2.4.1—HadoopMap Reduce Next Generation-2.4.1, Jun. 21, 2014, 11 pages.
HDFS Permissions Guide, Available Online at: http://hadoop.apache.org/docs/current/hadoop-project-dist/hadoop-hdfs/HdfsPermissionsGuide.html, Dec. 23, 2015, 6 pages.
Jaccard Index, Wikipedia, Available Online at: https://en.wikipedia.org/wiki/Jaccard_index, Dec. 23, 2015, 5 pages.
K-Means Clustering, Wikipedia, Available Online at: https://en.wikipedia.org/wiki/K-means_clustering, Dec. 23, 2015, 12 pages.
Launching Spark on YARN, Spark 0.9.0, Available Online at: http://spark.apache.org/docs/0.9.0/running-on-yarn.html, Dec. 23, 2015, 4 pages.
Making Sense of Word2vec, RaRe Technologies, RaRe Machine Learning Blog, Available Online at: http://rare-technologies.com/making-sense-of-word2vec/, Dec. 23, 2014, 16 pages.
MLlib—Feature Extraction and Transformation, Spark 1.5.2, Available Online at: http://spark.apache.org/docs/latest/mllib-feature-extraction.html, Dec. 23, 2015, 9 pages.
Running Spark on YARN, Spark 1.5.2, Available Online at: http://spark.apache.org/docs/latest/running-on-yarn.html, Dec. 23, 2015, 4 pages.
Securing the Hadoop Ecosystem, ATM (Cioudera) & Tucu (Cioudera), Hadoop Summit, Available Online at: http://www.slideshare.net/Hadoop_Summit/abdelnur-myers-june261120room230av2, Jun. 2013, 27 pages.
Service Level Authorization Guide, Apache Hadoop 2.6.0-cdh5.5.1, Available Online at: http://archive.cloudera.com/cdh5/cdh/5/hadoop/hadoop-project-dist/hadoop-common/ServiceLevelAuth.html, Dec. 23, 2015, 3 pages.
Sorensen—Dice Coefficient, Wikipedia, Available Online at: https://en.wikipedia.org/wiki/S%C3%B8rensen%E2%80%93Dice_coefficient, Dec. 23, 2015, 4 pages.
Sqoop User Guide (v1.4.2), Available Online at: http://sgoop.apache.org/docs/1.4.2/SgoopUserGuide.html, Dec. 23, 2015, 37 pages.
Suffix Tree, Wikipedia, Available Online at: http://en.wikipedia.org/wiki/Suffix_tree, Dec. 23, 2015, 7 pages.
Supported File Systems, Commons VFS, Version: 2.1—Snapshot, Available Online at: http://commons.apache.org/proper/commons-vfs/filesystems.html, Feb. 28, 2014, 6 pages.
Trie, Wikipedia, Available Online at: http://en.wikipedia.org/wiki/Trie, Dec. 23, 2015, 8 pages.
Tversky index, Wikipedia, Available Online at: https://en.wikipedia.org/wiki/Tversky_index, Dec. 23, 2015, 2 pages.
Welcome to Apache Flume, Available Online at: http://flume.apache.org/, Dec. 23, 2015, 7 pages.
Yago: A High-Quality Knowledge Base, Databases and Information Systems, Available Online at: http://www.mpi-inf.mpg.de/departments/databases-and-information-systems/research/yago-naga/yago//, Dec. 23, 2015, 4 pages.

(56) References Cited

OTHER PUBLICATIONS

U.S. Appl. No. 14/864,485, Final Office Action dated May 16, 2018, 22 pages.
U.S. Appl. No. 14/864,485, Non-Final Office Action dated Oct. 2, 2017, 25 pages.
U.S. Appl. No. 14/864,485, Notice of Allowance dated Sep. 24, 2018, 7 pages.
U.S. Appl. No. 14/864,496, Final Office Action dated Jul. 3, 2018, 24 pages.
U.S. Appl. No. 14/864,496, Non-Final Office Action dated Nov. 2, 2017, 20 pages.
U.S. Appl. No. 14/864,505, Final Office Action dated Jul. 31, 2018, 22 pages.
U.S. Appl. No. 14/864,505, Non-Final Office Action dated Mar. 7, 2018, 17 pages.
U.S. Appl. No. 14/864,513, Final Office Action dated Sep. 5, 2018, 28 pages.
U.S. Appl. No. 14/864,513, Non-Final Office Action dated Dec. 14, 2017, 27 pages.
U.S. Appl. No. 14/864,520, Final Office Action dated Jul. 20, 2018, 28 pages.
U.S. Appl. No. 14/864,520, Non-Final Office Action dated Nov. 16, 2017, 23 pages.
Angell et al., Automatic Spelling Correction Using Trigram Similarity Measure, Information Processing & Management, vol. 19, No. 4, 1983, pp. 255-261.
Benkhalifa et al., Integrating External Knowledge to Supplement Training Data in Semi-Supervised Learning for Text Categorization, Journal Information Retrieval, vol. 4, Issue 2, Jul. 2001, pp. 91-113.
Boruvka, On a Certain Minimal Problem, Faculty of Moravian, vol. III, Publication 3, 1926, pp. 37-58.
Buscaldi et al., LIPN-CORE: Semantic Text Similarity using n-grams, WordNet, Syntactic Analysis, ESA and Information Retrieval based Features, Second Joint Conference on Lexical and Computational Semantics Proceedings of the Main Conference and the Shared Task, Jun. 13, 2013, pp. 162-168.
Dave, IndexedRDD: Efficeint Fine-Grained Updates for RDD's, UC Berkeley AMPLab, Available Online at: http://www.slideshare.net/SparkSummit/ankur-dave, Jun. 15, 2015, 26 pages.
Edmonds, Choosing the Word Most Typical in Context: Using a Lexical Co-occurrence Network, In Proceedings of the 35th Annual Meeting of the Association for Computational Linguistics, Available Online at: https://arxiv.org/pdf/cs/9811009.pdf, Jul. 1997, pp. 507-509.
Elmagarmid et al., Duplicate Record Detection: A Survey, IEEE Transactions on Knowledge and Data Engineering, vol. 19, No. 1, Jan. 2007, pp. 1-16.
European Application No. 15781210.8, Office Action dated Feb. 28, 2018, 6 pages.
European Application No. 15781210.8, Summons to Attend Oral Proceedings dated Jun. 19, 2018, 10 pages.
European Application No. EP15781486.4, Office Action dated Jun. 6, 2018, 7 pages.
Miller et al., Performance and Scalability of a Large-Scale N-Gram Based Information Retrieval System, Retrieved from the Internet: URL:http//citeseer.ist.psu.edu/cache/papers/cs/15866/http:zSzzSzwww.c se.ucsc.eduzSz-elmzSzPaperszSztelltale.JODI.pdf/ millerOOperformance.pdf, vol. 1, No. 5, 2000, 24 pages.
Florek et al., On Liaison and Points Dividing a Finite Set, Colloquium Mathematica, vol. 2, Issue 3-4, 1951, pp. 282-285.
Fossati et al., A Mixed Trigrams Approach for Context Sensitive Spell Checking, Department of Computer Science, Retrieved from the internet: http://nlp.cs.uic.edu/PS-papers/spell-cicling07.pdf, 2007, 11 pages.
Fu et al., Learning Semantic Hierarchies via Word Embeddings, Proceedings of the 52nd Annual Meeting of the Association for Computational Linguistics, Available Online at: http://ir.hit.edu.cn/~rjfu/publications/acl2014.pdf, Jun. 23-25, 2014, pp. 1199-1209.
Homma et al., An Artificial Neural Network for Spatiotemporal Bipolar patterns: Application to Phoneme Classification, Proceeding NIPS'87 Proceedings of the 1987 International Conference on Neural Information Processing Systems, 1988, pp. 31-40.
Islam et al., Text Similarity Using Google Tri-grams, Proceeding Canadian AI'12 Proceedings of the 25th Canadian conference on Advances in Artificial Intelligence, May 28, 2012, pp. 312-317.
Jaccard, The Distribution of the Flora in the Alpine Zone, New Phytoiiogist, vol. 11, No. 2, Available Online at: http://www.researchgate.net/profile/Paul_Jaccard/publication/230302439_The_distribution_of_the_flora_in_the_alpin.e_zone/links/02e7e51cb76619a0fa000000.pdf, Feb. 1912, 15 pages.
Jones, A Statistical Interpretation of Term Specificity and its Application in Retrieval, Journal of Documentation, vol. 28, No. 1, 1972, 9 pages.
Kalchbrenner et al., A Convolutional Neural Network for Modelling Sentences, Proceedings of the 52nd Annual Meeting of the Association for Computational Linguistics, Available Online at: https://arxiv.org/abs/1404.2188, Apr. 8, 2014, 11 pages.
Li et al., Efficient Merging and Filtering Algorithms for Approximate String Searches, Data Engineering, IEEE 24th International Conference on Data Engineering, Apr. 7, 2008, pp. 257-266.
Lin, An Information-Theoretic Definition of Similarity, Dept. of Computer Science, Proceedings of the Fifteenth International Conference on Machine Learning, 1998, 9 pages.
Malak, 17 Qualities of the Ideal Recommender System, Available Online at: http://datascienceassn.org/content/17-qualities-ideal-recommender-system, Aug. 9, 2014, 3 pages.
Malak, Extending Word2Vec for Performance and Semi-Supervised Learning, Oracle, Available Online at: http://spark-summit.org/2015/talk/extending-word2vec-for-performance-and-semi-supervised-learning, Jun. 15, 2015, 39 pages.
Markines et al., Evaluating Similarity Measures for Emergent Semantics of Social Tagging, International World Wide Web Conference 18th, Apr. 24, 2009, pp. 641-650.
Mikolov et al., Exploiting Similarities Among Languages for Machine Translation, Available Online at: http://arxiv.org/pdf/1309.4168.pdf, Sep. 17, 2013, 10 pages.
Okazaki et al., Simple and Efficient Algorithm for Approximate Dictionary Matching, Proceedings of the 23rd International Conference on Computational Linguistics, Retrieved from the Internet: URL: http://www.aclweb.org/anthology/C10-1096.pdf, Aug. 2010, pp. 851-859.
Ouyang et al., Sentiment Analysis Using Convolutional Neural Network, IEEE International Conference on Computer and Information Technology; Ubiquitous Computing and Communications; Dependable, Autonomic and Secure Computing; Pervasive Intelligence and Computing, Oct. 26-28, 2015, pp. 2359-2364.
International Application No. PCT/US2015/052190, International Preliminary Report on Patentability dated Apr. 6, 2017, 18 pages.
International Application No. PCT/US2015/052190, International Search Report and Written Opinion dated Dec. 9, 2015, 20 pages.
International Application No. PCT/US2015/052228, International Preliminary Report on Patentability dated Apr. 6, 2017, 8 pages.
International Application No. PCT/US2015/052228, International Search Report and Written Opinion dated Nov. 18, 2015, 11 pages.
Ricci, Part 15: Knowledge-Based Recommender Systems, Available Online at: http://www.ics.uci.edu/~welling/teaching/CS77Bwinter12/presentations/course_Ricci/15-KnowledgeBased.pdf, Dec. 23, 2015, 58 pages.
Sanborn et al., A Bigram Extension to Word Vector Representation, Available Online at: http://cs229.stanford.edu/proj2014/Adrian%20Sanborn,%20Jacek%20Skryzalin,%20A%20bigram%20extension%20to%20word%20vector%20representation.pdf, 2015, 5 pages.
Sedding et al., WordNet-Based Text Document Clustering, Proceedings of the 3rd Workshop on Robust Methods in Analysis of Natural Language Data, Romano '04, Jan. 1, 2004, pp. 104-113.
Smetanin, Fuzzy String Search, Nikita's Blog, Search Algorithms, Software Development and so on, Available Online at: http://ntz-develop.blogspot.com/2011/03/fuzzy-string-search.html, Mar. 24, 2011, 13 pages.
Suchanek et al., YAGO: A Core of Semantic Knowledge Unifying WordNet and Wikipedia, Proceeding WWW '07 Proceedings of the

(56) References Cited

OTHER PUBLICATIONS

16th International Conference on World Wide Web, Session: Ontologies Available Online at: http://www2007.org/papers/paper391.pdf, May 2007, pp. 697-706.

Whitelaw et al., Using the Web for Language Independent Spellchecking and Autocorrection, Proceedings of the 2009 Conference on Empirical Methods in Natural Language Processing, vol. 2, Aug. 2009, pp. 890-899.

Yang et al., Learning Multi-Relational Semantics Using Neural-Embedding Models, Cornell University Library, Available Online at: http://arxiv.org/abs/1411.4072, Nov. 14, 2014, 5 pages.

* cited by examiner

DATA STANDARDIZATION TECHNIQUES

CROSS-REFERENCE TO RELATED APPLICATIONS

This application is a non-provisional application of and claims priority to U.S. Provisional Application No. 62/566,123, filed on Sep. 29, 2017, which is incorporated herein by reference in its entirety for all purposes.

BACKGROUND

Before "big data" systems analyze data to provide useful results, the data may undergo pre-processing to facilitate the analysis. Among other things, the pre-processing may involve performing data standardization to address inconsistencies in the data. Data inconsistencies may be attributed to a variety of sources. For example, in scenarios involving textual data, the inconsistencies may arise from abbreviations, misspellings, regional spelling conventions, typographical errors, and/or any other cause of variation in data representation.

However, it is difficult to accurately perform data standardization in an automated fashion. Automated standardization can be implemented using reference data, such as a data dictionary that maps variant representations to a standard representation, but such reference data is often unavailable. One reason for this is the fact that the same data can have more than one standard representation. For example, both "Saint Louis" and "St. Louis" can be standard representations of the same data, because both of them are lexically correct. Furthermore, preparation of such reference data can be a significant source of overhead, especially for large sets of data (e.g., database tables having millions of rows).

Accordingly, a significant amount of the data standardization process is often performed manually. However, this does not scale well for large sets of data.

SUMMARY

The present disclosure relates generally to data standardization techniques. More particularly, techniques are described for identifying standard representation terms for to-be-standardized data. Various inventive embodiments are described herein, including methods, systems, non-transitory computer-readable storage media storing programs, code, or instructions executable by one or more processors, and the like.

Techniques are disclosed for standardization of data. According to a first technique, standard representation terms are determined for to-be-standardized data using the to-be-standardized data itself and without using any external reference data. According to a second technique, a combination of the to-be-standardized data and an external reference is used to determine standard representation terms for the to-be-standardized data.

Preparing reference data can be costly. Thus, according to the first technique, standard representation terms may be determined for to-be-standardized data without using reference data. Instead, comparisons may be performed between different terms of the to-be-standardized data, thereby determining approximate matches within the to-be-standardized data. The approximate matches may be grouped into clusters according to similarity. A standard representation term may be selected from each cluster based upon a preference for longer terms.

However, if reference data is available, standard representation terms may be determined for to-be-standardized data according to the second technique. More specifically, this determination may be performed in multiple stages for increased accuracy (e.g., by avoiding false positives). A first stage may provide an indication of which terms in the to-be-standardized data are likely to be standard representation terms by identifying exact matches between terms in the to-be-standardized data and terms in the reference data. A second stage and a third stage may provide indications of which terms in the to-be-standardized data are approximate matches of likely-to-be standard representation terms. The second stage may provide an indication of which terms in the to-be-standardized data are approximate matches of the likely-to-be standard representation terms identified in the first stage. The third stage may provide an indication of which terms in the to-be-standardized data are approximate matches of terms in the reference data that are also likely to be standard representation terms. Results of the second stage may be used to increase the accuracy of the third stage by using high-similarity approximate matches to filter out low-similarity approximate matches.

For example, in certain implementations of the first technique, a data standardization system may receive to-be-standardized data comprising a plurality of terms (e.g., string values). Each term may comprise one or more words. The data standardization system may determine frequencies of words occurring in the to-be-standardized data. Additionally, the data standardization system may identify a set of one or more common words based upon the frequencies. Identifying the set of one or more common words may comprise including, in the set of one or more common words, a word that occurs in the set of to-be-standardized data with a frequency that exceeds a predetermined threshold value.

The data standardization system may determine similarities between the terms in the to-be-standardized data by performing an approximate string matching operation between the terms in the to-be-standardized data. Performing the approximate string matching operation between any two terms in the to-be-standardized data may comprise performing matching (e.g., exact matching) between features extracted from the two terms. Matching the features may comprise using a first weight for matching when a feature corresponds to (e.g., is included in) a common word in the set of one or more common words and using a second weight for matching when a feature corresponds to a word not in the set of one or more common words. The first weight may be different from the second weight.

In some embodiments, performing the approximate string matching operation may involve using an n-gram as a feature. For example, the n-gram may be a trigram comprising three consecutive elements (e.g., characters) of a term.

Weighting a feature included in a common word may be performed in various ways. For example, the first weight may be set to a predetermined fixed value. As another example, the first weight may be set to a variable value that is determined based upon a frequency with which the common word occurs in the to-be-standardized data.

Based upon the similarities between the terms in the to-be-standardized data, the data standardization system may determine a plurality of clusters. Each cluster in the plurality of clusters may comprise one or more terms from the to-be-standardized data. The data standardization system may then identify standard representation terms for the plurality of clusters. Thus, for each cluster in the plurality of clusters, the data standardization system may identify a recommended term for the cluster from the one or more terms in the cluster.

In some embodiments, identifying the recommended term for each cluster in the plurality of clusters may involve recommendation metrics. For example, the data standardization system may compute a set of recommendation metric for terms in the cluster. A recommendation metric for a term in the cluster may be computed based upon a length of the term and a frequency with which the term occurs in the to-be-standardized data. The set of recommendation metrics may be used, by the data standardization system, to determine the recommended term for the cluster.

Furthermore, the data standardization system may identify a standard representation term for each cluster in the plurality of clusters. This may be achieved in various ways. In some embodiments, for a first cluster in the plurality of clusters, a recommended term for the first cluster may be identified as a standard representation term for the first cluster. In some embodiments, for a first cluster in the plurality of clusters, a standard representation term for the first cluster that is different from a recommended term for the first cluster may be identified.

In some embodiments, identifying a standard representation term for each cluster in the plurality of clusters may involve user input. For example, for a first cluster in the plurality of clusters, a plurality of terms included in the first cluster and information identifying a recommended term of the first cluster may be displayed. Thereafter, user input may be received. The user input may be indicative of the recommended term for the first cluster to be used as the standard representation term for the first cluster. Additionally or alternatively, the user input may be indicative of a different term (e.g., a term that is different from the recommended term for the first cluster) to be used as a standard representation term for the first cluster.

The standard representation terms identified for the plurality of clusters may be used, by the data standardization system, to perform standardization of the to-be-standardized data. Performing the standardization may comprise, for a first cluster in the plurality of clusters, transforming occurrences in the to-be-standardized data of a first term (e.g., a term that is different from the standard representation term for the first cluster) included in the first cluster with a standard representation term identified for the first cluster. Additionally or alternatively, performing the standardization may comprise, for a first cluster in the plurality of clusters, providing a first function for transforming occurrences, in the to-be-standardized data, of terms in the first cluster to a standard representation term identified for the first cluster.

As another example, in certain implementations of the second technique, a data standardization system may receive to-be-standardized data comprising a plurality of terms (e.g., string values). Each term may comprise one or more words. The data standardization system may also determine reference data to be used for standardizing the to-be-standardized data. Thereafter, the data standardization system may perform an exact string matching operation between the to-be-standardized data and the reference data to determine a set of one or more exact matches and a set of non-exact matches.

Furthermore, the data standardization system may determine frequencies of words occurring in the reference data. This enables the data standardization system to identify a set of one or more common words based upon the frequencies. Identifying the set of one or more common words may comprise including, in the set of one or more common words, any word that occurs in the reference data with a frequency that exceeds a predetermined threshold value.

Thereafter, the data standardization system may determine similarities between terms in the set of non-exact matches and terms in the set of one or more exact matches by performing an approximate string matching operation between the terms in the set of non-exact matches and the terms in the set of one or more exact matches. Performing the approximate string matching operation between a term in the set of non-exact matches and a term in the set of one or more exact matches may comprise matching features extracted from the term in the set of non-exact matches against features extracted from the term in the set of one or more exact matches. Matching the features may comprise using a first weight for the matching when a feature corresponds to (e.g., is included in) a common word in the set of common words and using a second weight (e.g., a weight that is different from the first weight) for the matching when a feature corresponds to a word not in the set of one or more common words.

In some embodiments, performing the approximate string matching operation may involve using an n-gram as a feature. For example, the n-gram may be a trigram comprising three consecutive elements (e.g., characters) of a term.

Weighting a feature included in a common word may be performed in various ways. For example, the first weight may be set to a predetermined fixed value. As another example, the first weight may be set to a variable value that is determined based upon a frequency with which the common word occurs in the reference data.

Based upon the similarities between the terms in the set of non-exact matches and the terms in the set of one or more exact matches, the data standardization system may determine a suggestion set comprising a plurality of groupings. Each grouping in the plurality of groupings may comprise terms that share a similarity metric exceeding a first threshold value. Furthermore, the data standardization system may identify, based upon the similarities between the terms in the set of non-exact matches and the terms in the set of one or more exact matches, a subset of the set of non-exact matches. The subset may comprise one or more terms included in a grouping, of the plurality of groupings, that has a similarity metric not exceeding a second threshold value.

The data standardization system may then determine similarities between terms in the subset and terms in the reference data by performing an approximate string matching operation between the terms in the subset and the terms in the reference data. Performing the approximate string matching operation between a term in the subset and a term in the reference data may comprise matching features extracted from the term in the subset against features extracted from the term in the reference data. Matching the features may comprise using the first weight for the matching when a feature corresponds to (e.g., is included in) a common word in the set of one or more common words and using the second weight for the matching when a feature corresponds to a word not in the set of one or more common words. Based upon the similarities between the terms in the subset and the terms in the reference data, the data standardization system may determine one or more additional groupings to include in the suggestion set.

The data standardization system may identify one or more recommended terms from terms in the suggestion set. Identifying the one or more recommended terms may comprise identifying a set of groupings sharing a term from the set of non-exact matches and identifying a grouping having a highest similarity metric of the set of groupings.

Furthermore, the data standardization may identify one or more standard representation terms for the suggestion set. In some embodiments, identifying the one or more standard representations terms for the suggestion set may comprise identifying a recommended term of the one or more recommended terms as a standard representation term of the one or more standard representation terms. In some embodiments, identifying the one or more standard representation terms for the suggestion set may comprise identifying a standard representation term of the one or more standard representation terms that is different from a recommended term of the one or more recommended terms.

In some embodiments, identifying the one or more standard representation terms for the suggestion set may involve user input. For example, for a first set of groupings sharing a term from the set of non-exact matches, a plurality of terms included in the first set of groupings and information identifying a recommended term of the first set of groupings may be displayed. Thereafter, user input may be received. The user input may be indicative of the recommended term for the first set of groupings to be used as the standard representation term for the first set of groupings. Additionally or alternatively, the user input may be indicative of a different term (e.g., a term that is different from the recommended term for the first set of groupings) to be used as a standard representation term for the first set of groupings.

The one or more standard representation terms identified for the suggestion set may be used, by the data standardization system, to perform standardization of the to-be-standardized data. Performing the standardization may comprise, for a first set of groupings sharing a term from the set of non-exact matches, transforming occurrences in the to-be-standardized data of a first term (e.g., a term that is different from the standard representation term for the first set of groupings) included in the first set of groupings with a standard representation term identified for the first set of groupings. Additionally or alternatively, performing the standardization may comprise, for a first set of groupings sharing a term from the set of non-exact matches, providing a first function for transforming occurrences, in the to-be-standardized data, of terms in the first set of groupings to a standard representation term identified for the first set of groupings.

As yet another example, in certain implementations of the first technique or the second technique, a data standardization system may receive a to-be-standardized data comprising a plurality of terms (e.g., string values). Each term may comprise one or more words. The data standardization system may identify a set of one or more common words based upon the to-be-standardized data. In implementations of the first technique, the set of one or more common words may comprise one or more words that frequently occur in the to-be-standardized data. In implementations of the second technique, the set of one or more common words may comprise one or more words that frequently occur in reference data.

The data standardization system may then determine similarities between the terms in the to-be-standardized data and terms in a set of terms by performing an approximate string matching operation between the terms in the to-be-standardized data and the terms in the set of terms. In implementations of the first technique, the set of terms may be the to-be-standardized data itself. In implementations of the second technique, the set of terms may be some or all of the reference data.

Performing the approximate string matching operation between a term in the to-be-standardized data and a term in the set of terms may comprise matching features extracted from the term in the to-be-standardized data against features extracted from the term in the set of terms. Matching the features may comprise using a first weight for the matching when a feature corresponds to (e.g., is included in) a word in the set of one or more common words and using a second weight (e.g., a weight that is different from the first weight) for the matching when a feature corresponds to a word not in the set of one or more common words.

Based upon the similarities between the terms in the to-be-standardized data and the terms in the set of terms, the data standardization system may determine a plurality of groupings or a plurality of clusters. Each grouping/cluster in the plurality of groupings/clusters may comprise one or more terms from the to-be-standardized data. In implementations of the first technique, a plurality of clusters is determined. In implementations of the second technique, a plurality of groupings is determined.

The data standardization system may identify one or more standard representation terms for the plurality of groupings/clusters. This may involve identifying one or more recommended terms from terms in the plurality of groupings/clusters. In some embodiments, a recommended term of the one or more recommended terms may be identified as a standard representation term of the one or more standard representation terms. In some embodiments, a standard representation term of the one or more standard representation terms may be different from a recommended term of the one or more recommended terms. The data standardization system may perform standardization of the to-be-standardized data using the one or more standard representation terms identified for the plurality of groupings/clusters.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of example embodiments. However, it will be apparent that various embodiments may be practiced without these specific details. The figures and description are not intended to be restrictive.

The present disclosure relates generally to data standardization techniques. More particularly, techniques are described for identifying standard representation terms for to-be-standardized data. Various inventive embodiments are described herein, including methods, systems, non-transitory computer-readable storage media storing programs, code, or instructions executable by one or more processors, and the like.

Techniques are disclosed for standardization of data. According to a first technique, standard representation terms are determined for to-be-standardized data using the to-be-standardized data itself and without using any external reference data. According to a second technique, a combination of the to-be-standardized data and an external reference is used to determine standard representation terms for the to-be-standardized data.

Preparing reference data can be costly. Thus, according to the first technique, standard representation terms may be determined for to-be-standardized data without using reference data. Instead, comparisons may be performed between different terms of the to-be-standardized data, thereby determining approximate matches within the to-be-standardized data. The approximate matches may be grouped into clusters according to similarity. A standard representation term may be selected from each cluster based upon a preference for longer terms.

However, if reference data is available, standard representation terms may be determined for to-be-standardized data according to the second technique. More specifically, this determination may be performed in multiple stages for increased accuracy (e.g., by avoiding false positives). A first stage may provide an indication of which terms in the to-be-standardized data are likely to be standard representation terms by identifying exact matches between terms in the to-be-standardized data and terms in the reference data. A second stage and a third stage may provide indications of which terms in the to-be-standardized data are approximate matches of likely-to-be standard representation terms. The second stage may provide an indication of which terms in the to-be-standardized data are approximate matches of the likely-to-be standard representation terms identified in the first stage. The third stage may provide an indication of which terms in the to-be-standardized data are approximate matches of terms in the reference data that are also likely to be standard representation terms. Results of the second stage may be used to increase the accuracy of the third stage by using high-similarity approximate matches to filter out low-similarity approximate matches.

Figure 1:
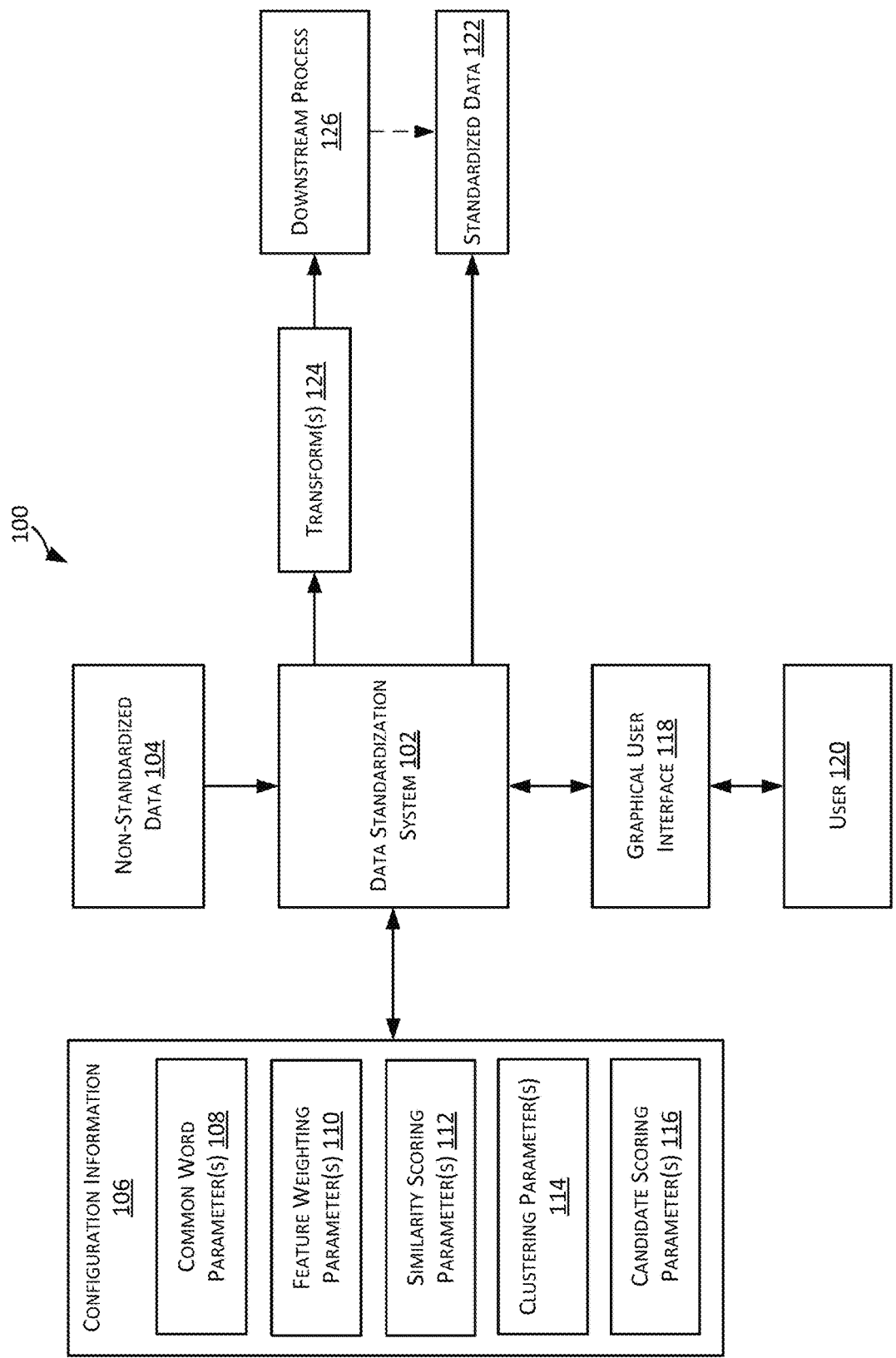
FIG. 1 is a simplified block diagram of a computing environment incorporating an example dictionary-free embodiment.

FIG. 1 is a simplified block diagram of a computing environment 100 incorporating an example dictionary-free embodiment. Computing environment 100 may comprise multiple systems communicatively coupled to each other via one or more communication networks (not shown).

As used herein, a communication network facilitates communications between various systems. A communication network can be of various types and can include one or more communication networks. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, a communication network may include any infrastructure that facilitates communications between various systems.

The systems in FIG. 1 include a data standardization system 102, which may be communicatively coupled to one or more other systems displaying a graphical user interface 118 and/or executing a downstream process 126. Computing environment 100 depicted in FIG. 1 is merely an example and is not intended to unduly limit the scope of claimed embodiments. One of ordinary skill in the art would recognize many possible variations, alternatives, and modifications. For example, in some implementations, computing environment 100 may have more or fewer systems or components than those shown in FIG. 1, may combine two or more systems, or may have a different configuration or arrangement of systems.

Data standardization system 102 may comprise one or more processors and memory resources. Processors may include single or multicore processors. Processors may include general purpose microprocessors such as ones provided by Intel®, AMD®, ARM®, Freescale Semiconductor, Inc., and the like, that operate under the control of software stored in associated memory. An application executed by data standardization system 102 may be executed by one or more processors.

Memory resources of data standardization system 102 may include a system memory and non-volatile memory. System memory may provide memory resources for processors. System memory is typically a form of volatile random access memory (RAM) (e.g., dynamic random access memory (DRAM), Synchronous DRAM (SDRAM), Double Data Rate SDRAM (DDR SDRAM)). Information related to an operating system and applications or processes executed by processors may be stored in system memory. For example, during runtime an operating system/kernel may be loaded into system memory. Additionally, during runtime, data related to one or more applications executed by data standardization system 102 may be loaded into system memory. For example, an application being executed by data standardization system 102 is loaded into system memory and executed by a processor. Data processing system 102 may be capable of executing multiple applications in parallel.

Non-volatile memory may be used to store data that is to be persisted. Non-volatile memory may come in different forms such as a hard disk, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like. In certain instances, when an application is deployed to or installed on data standardization system 102, information related to the application may be stored in non-volatile memory.

Furthermore, applications executed by data standardization system 102 may use one or more storage resources. These storage resources may be distributed and/or virtualized within environment 100. For example, in a cloud environment, the storage resources may be spread across one or more data centers possibly at different geographical locations. Each data center may comprise multiple types of storage resources. Use of and access to these storage resources may be managed by one or more virtual machines executed by the data centers. These virtual machines may be referred to as storage virtual machines since they are responsible for providing storage-related services.

Referring to FIG. 1, data standardization system 102 accesses non-standardized data 104 for processing. Non-standardized data 104 may be accessed from a memory or storage resource included in or coupled to data standardization system 102. Non-standardized data 104 may comprise any number of various data types including, without limitation, strings, characters, integers, and floating point values. Furthermore, non-standardized data 104 may have any of various formats including, without limitation, XML, JSON, CSV, and/or a tabular format. However, for the purposes of providing a clear example, the following description refers to the example of non-standardized data 104 comprising terms stored in a column of a database table. Each term may comprise one or more words.

In the example of FIG. 1, data standardization system 102 processes non-standardized data 104 using configuration information 106 comprising common word parameter(s) 108, feature weighting parameter(s) 110, similarity scoring parameter(s) 112, clustering parameter(s) 114, and candidate scoring parameter(s) 116. Configuration information 106 may be accessed from a memory or storage resource included in or coupled to data standardization system 102.

As mentioned above, in dictionary-free embodiments, processing may comprise determining approximate matches between different terms of non-standardized data 104. For increased accuracy in determining approximate matches between the different terms of non-standardized data 104, words that occur less frequently may be emphasized over words that occur more frequently. To illustrate, placing equal emphasis on each word can lead to incorrectly determining that "Saint Louis" and "Saint Paul" are variants of the same data, because they both share the word "Saint". To avoid this incorrect result, the word "Saint" can be de-emphasized, because it is a frequently occurring word. For the sake of clarity and ease of reference, a frequently occurring word is referred to herein as a "common word".

Common word parameter(s) 108 may be used to determine which words in non-standardized data 104 are to be treated as common words. For example, common word parameter(s) 108 may comprise a predetermined threshold value of frequency that should be exceeded in order for a particular word to be considered a common word.

Increased accuracy may also be achieved by determining approximate matches using an increased level of granularity for performing comparisons. For example, instead of performing comparisons between words as a whole, features (e.g., prefixes and/or n-grams) of words can be compared to determine approximate matches. Feature comparison is described in U.S. Pat. No. 9,070,090 issued Jun. 30, 2015, and titled "Scalable String Matching as a Component for Unsupervised Learning in Semantic Meta-model Development"; and U.S. Pat. No. 7,856,598 issued Dec. 21, 2010, and titled "Spelling Correction with Liaoalphagrams and Inverted Index", the entirety of each of which is incorporated by reference herein.

Feature weighting parameter(s) 110 may be used to determine how to weight different types of features when performing feature comparisons. For example, n-gram features (e.g., trigrams comprising three consecutive characters of a term) included in a common word may be assigned a weight having a fixed value of 0.25, whereas n-gram features not included in a common word may be assigned a weight having a fixed value of 1.0. As another example, n-gram features included in a common word may be assigned a weight that varies according to a frequency with which the common word occurs in X.

As mentioned above, determining approximate matches may involve computing metrics that indicate degrees of similarity between terms. Such metrics are referred to herein as "similarity scores".

Similarity scoring parameter(s) 112 may be used to determine how to compute similarity scores between terms. For example, similarity scoring parameter(s) 112 may comprise one or more formulas and/or coefficients for computing the Sorensen-Dice coefficient, the Jaccard index, or any other measure of similarity between two or more samples.

As mentioned above, approximate matches may be grouped into clusters according to similarity (e.g., based upon similarity scores). Thus, each cluster may comprise one or more variants of the same term. Variants may be clustered together if they are sufficiently similar to the same term.

Clustering parameter(s) 114 may be used to determine which variants are "sufficiently similar" to a particular term. For example, clustering parameter(s) 114 may comprise a predetermined threshold value that a similarity score should exceed in order for a term to be included in a cluster.

As mentioned above, standard representations may be selected from clusters. This may be achieved based upon computing metrics that indicate suitability for selection. Such metrics are referred to herein as "candidate scores". As described in greater detail below, candidate scores may be used to determine recommended terms for selection as standard representations.

Candidate scoring parameter(s) 116 may be used to determine how to compute candidate scores for terms. For example, candidate scoring parameter(s) 116 may comprise one or more formulas and/or coefficients that account for one or more characteristics of a term including, without limitation, the length of the term, the occurrence frequency of the term, and/or the number of variants in the term's cluster.

Processing non-standardized data 104 may facilitate selection of standard representations from the non-standardized data 104. As described below, selection of standard representations may be performed manually or automatically based upon recommended terms.

In some embodiments, selecting standard representations may involve input from a user 120. For example, recommended terms may be presented to user 120 via a graphical user interface (GUI) 118. User 120 may then provide input, via GUI 118 and/or some other input device, indicating user selection of standard representations based upon the recommended terms and/or other variants.

In some embodiments, data standardization system 102 may automatically select standard representations. For example, data standardization system 102 may select recommended terms to be standard representations.

When one or more standard representations have been selected, data standardization system 102 may transform and/or cause transformation of non-standardized data 104 into standardized data 122. In some embodiments, data standardization system 102 may perform one or more transformation operations on at least some of non-standardized data 104. For example, data standardization system 102 may perform search and replace operations on non-standardized data 104. In some embodiments, data standardization system 102 may generate transform(s) 124, and a downstream process 126 may perform one or more transformation operations on at least some of non-standardized data 104 based upon the transform(s) 124.

Transform(s) 124 may comprise a script that executes at runtime to transform non-standardized data 104 into standardized data 122. Thus, data standardization system 102 may generate transform(s) 124 by creating, in the script, an entry comprising a to-be-replaced value and its replacement value.

Computing environment 100 depicted in FIG. 1 is merely an example and is not intended to be limiting. One of ordinary skill in the art would recognize many possible variations, alternatives, and modifications. For example, in some implementations, computing environment 100 may have more or fewer components than those shown in FIG. 1, may combine two or more components, or may have a different configuration or arrangement of components. While only one data standardization system 102 is depicted in FIG. 1 for purposes of simplicity, this is not intended to be limiting.

The infrastructure described above can be implemented in various different environments including a cloud environment (could be various types of clouds including private, public, and hybrid cloud environments), on-premises environment, a hybrid environment, and the like.

Figure 2A:
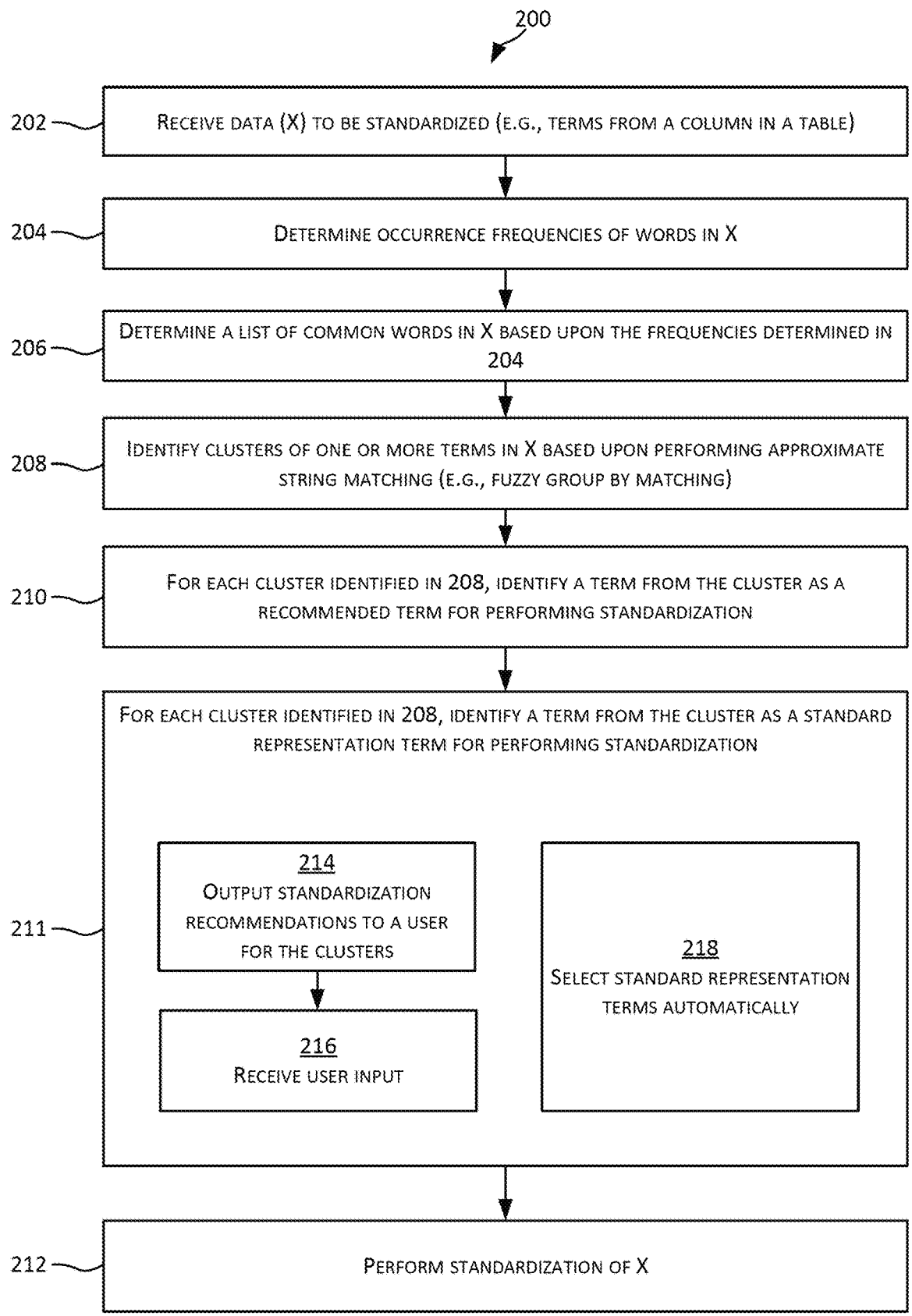
FIGS. 2A-B correspond to a flowchart depicting processing according to an example dictionary-free embodiment.
Figure 2B:
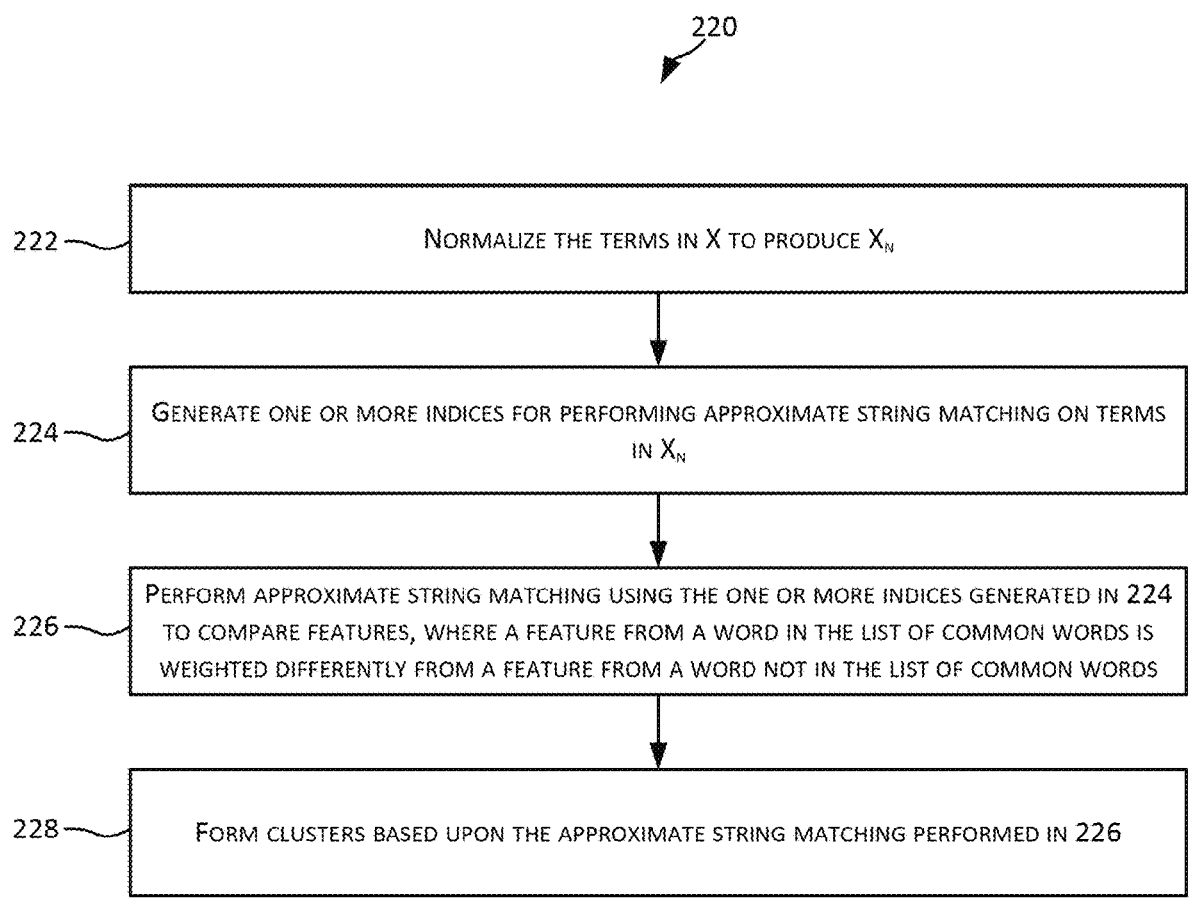

FIGS. 2A-B correspond to a flowchart 200 depicting processing according to an example dictionary-free embodiment. The processing depicted in FIGS. 2A-B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIGS. 2A-B and described below is intended to be illustrative and non-limiting. Although FIGS. 2A-B depict the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIGS. 2A-B may be performed by data standardization system 102.

As shown in FIG. 2A, a set of to-be-standardized data (referred to herein as "X") may be received at 202. The data X may comprise multiple elements or terms, each element or term comprising one or more words. In some embodiments, each element or term is a string comprising one or more characters. In some alternative embodiments, each element or term may be some structure other than a string.

In certain embodiments, the data X may correspond to entries in a column of a table (e.g., a database table). For example, a table may be configured for string information for a set of employees. Such a table may have multiple columns including a column for entering a city name where each employee resides. Each element in X may correspond to a row entry in the City Name column in the table. An example of such a column with sample entries is shown below:

| Column A (City Name) |
| --- |
| Saint Louis |
| St. Louis |
| Saint Paul |
| St. Paul |
| Denver |
| Saint Charles |
| St. Charles |

At 204, occurrence frequencies may be determined for words in X. An occurrence frequency for a particular word indicates the number of occurrences of the word in X. As part of the processing performed in 204, the elements in X may be tokenized to generate a set of individual words occurring in X. In the example above, the elements shown above in the "City Name" column may be tokenized to yield the following individual word tokens: "Saint", "Louis", "St.", "Louis", "Saint", "Paul", "St.", "Paul", "Denver", "Saint", "Charles", "St.", and "Charles". A set of unique words occurring in X (referred to herein as "$X_w$") may then be determined from the word tokens. $X_w$ for the "City Name" column example is: {"Saint", "Louis", "St.", "Paul", "Denver", "Charles"}. For each word in $X_w$, the number of times (or frequency) the word occurs in X is determined in 204.

As indicated above, elements or terms in X may be tokenized to identify individual words. In some embodiments, separators may be used to tokenize a term into words. For example, if a space character is a separator, then a term such as "Saint Charles" is tokenized into two words "Saint" and "Charles". A separator is not included in a word resulting from a tokenization operation. Other characters (e.g., punctuation marks such as a comma) may be used as separators in certain embodiments.

In some embodiments, the occurrence frequencies determined in 204 may be stored in $X_w$ such that $X_w$ comprises a set of tuples, with each tuple identifying a word occurring in X and a frequency value indicating the frequency of occurrence of that word in X. For example, for the words extracted from the "City Name" column, $X_w$ may comprise the following list: {("Saint", 3), ("St.", 3), ("Louis", 2), ("Paul", 2), ("Denver", 1), ("Charles", 2)}.

At 206, a set of common words (referred to herein as "$X_c$") may be determined based upon the occurrence frequencies determined in 204. This may involve comparing the occurrence frequencies to a predetermined threshold value. Various different formats may be used to represent the predetermined threshold value. In some embodiments, the threshold may be defined as a number of words, as a percentage of the words in X, and the like. For example, in one instance, the predetermined threshold value may be 20%. In such an instance, words in X that have an occurrence frequency of over 20% are tagged as common words and included in the set of common words. For the "City Name" example, $X_c$ may comprise the words "Saint" and "St.", because each of these words has an occurrence frequency of roughly 23%, which is over the 20% threshold.

At 208, clusters of one or more terms may be identified based upon comparing different terms in X. This may involve performing an approximate string matching operation between terms in X based upon computing similarity scores and then using them to identify clusters of terms. Computing similarity scores is described in greater detail below with reference to FIG. 2B.

As indicated above, similarity scores determined based upon the approximate string matching operation are used to form clusters. Two terms are included in a cluster if they are sufficiently similar. In some embodiments, two terms may be deemed to be sufficiently similar if their similarity score, which denotes a degree of match, is above a predetermined threshold value. For example, if the predetermined threshold value is 0.80 and if the terms "Saint Paul" and "St. Paul" have a similarity score of 0.86, then the terms may be clustered together.

In some embodiments, clustering may be performed according to a greedy algorithm. Example pseudocode for an example of a greedy algorithm that may be used is provided below.

Pseudocode A

1) Initialize clusters 1 through n (referred to herein as $C_1$ through $C_n$).
2) Loop through each term x in X to perform:
   a) if x is already included in a cluster, then exit the loop;
   b) include, in a set of approximate matches $M_x$, any other terms in X having a similarity score with x that exceeds a threshold value;
   c) remove any terms in $M_x$ that are already included in a cluster;
   d) include $M_x$ in a cluster $C_i$.

Using the example data X provided above for illustration, Pseudocode A may enable the following clusters to be provided as output:
$C_1$: {"Saint Louis", "St. Louis"};
$C_2$: {"Saint Paul", "St. Paul"};
$C_3$: {"Denver"};
$C_4$: {"Saint Charles", "St. Charles"}.

In some embodiments, each cluster may also include a frequency value for each term in the cluster. The frequency value may indicate a number of occurrences for that term in X. Thus, each cluster may be a set of one or more tuples, where each tuple comprises a term in that cluster and an associated frequency value of that term. For example, $C_1$ may include the tuples ("Saint Louis", 1) and ("St. Louis", 1). As described in greater detail below, storing occurrence frequencies in clusters facilitates computation of candidate scores.

At 210, for each cluster, a term from among the terms in the cluster is identified as a recommended term for performing standardization for that cluster. Identifying a recommended term for a cluster may, in some embodiments, involve computing candidate scores for each term in the cluster and then selecting a term in the cluster having the highest candidate score as the recommended term for the cluster.

Candidate scores may be computed in various ways. According to one technique, they are computed according to a heuristic that not only considers frequencies with which terms occur in X, but also considers lengths of the terms. Thus, the heuristic may comprise a component for occurrence frequency (referred to herein as the "frequency component") and a component for term length (referred to herein as the "length component"). In some embodiments, log scaling may be used to prevent the frequency component from overwhelming the length component and vice versa.

At 211, for each cluster identified in 208, a standard representation term is identified for the cluster. In the default case, the recommended term identified in 210 for a cluster is the standard representation term for the cluster. In certain embodiments, a user has the ability to specifically indicate that a different term, other than the recommended term, is to be used as the standard representation term for the cluster.

Accordingly, at 214, as part of identifying standard representation terms for the clusters in some embodiments, information for each cluster identified in 208 may be outputted to a user. The information may comprise the terms in the cluster and the recommended term for the cluster. For example, this information may be displayed to the user via a GUI, such as GUI 300 depicted in FIG. 3 and described below in further detail.

At 216, the user may provide input identifying which terms are to be used as the standard representation terms for the clusters. On a per-cluster basis, the user input may indicate that the recommended term for the cluster is to be used as the standard representation term for the cluster or that a different term, other than the recommended term, is to be used as the standard representation term for the cluster. For example, the different term provided by the user may be another term from the terms in the cluster other than the recommended term. Or the different term may be some other term.

To illustrate, the terms "Saint Louis" and "Saint Paul" may respectively be recommended terms for two separate clusters. A user may provide input confirming that the recommended term "Saint Louis" should be used as a standard representation term for a first cluster. However, the user may also provide input selecting "St. Paul" (overriding the recommended term "Saint Paul") as a standard representation term for a second cluster. The data standardization system may then identify the standard representation terms for the clusters based upon the user inputs in 216.

In certain embodiments, at 218, the recommended terms identified for the clusters in 210 may be automatically selected as the standard representation terms for the clusters. No user intervention may be needed in this case.

At 212, standardization of X is performed using the standard representation terms identified in 211. In certain embodiments, standardization involves, for each cluster, replacing occurrences in X of the terms in the cluster with the standard representation term for the cluster. For example, all instances of the term "St. Louis" in X may be replaced with the standard representation term "Saint Louis". In this manner, the to-be-standardized data X received in 202 is modified to generate standardized data. In some embodiments, the to-be-standardized data X may be itself modified to generate standardized data. In some other embodiments, the standardized data may be created separate from the to-be-standardized data. In some embodiments, instead of modifying the data, functions may be created and associated with data X such that when data X is consumed by a consumer, for each cluster, occurrences in X of the terms in the cluster are transformed to the standard representation term for the cluster.

As described above, in 208 of FIG. 2A, clusters are identified for the terms in data X. FIG. 2B depicts a simplified flowchart 220 depicting processing that may be performed as part of 208 in FIG. 2A in certain embodiments.

At 222, terms in X may be normalized to produce a set of normalized terms $X_n$. Normalization may involve converting upper-case letters into lower-case letters, stripping punctuation marks, converting Unicode whitespace characters into plain spaces, and/or removing consecutive spaces. For example, "St. Louis" may be normalized to "st louis".

At 224, one or more indices may be generated for performing approximate string matching on $X_n$. Each index may be a mapping between features and words/terms in $X_n$ that include the features. For example, a first index may map n-grams to words, and a second index may map prefixes of length m to terms, where n and m can have any value greater than or equal to 1. To illustrate, example indices for trigrams (Index A) and prefixes of length 1 (Index B) are provided below, where <B> represents a beginning boundary and <E> represents an ending boundary. For the sake of brevity, the example indices are depicted as being generated only for the words in the normalized term "st louis".

| Index A | |
|---|---|
| <B>st | st |
| <B>lo | louis |
| is<E> | louis |
| lou | louis |
| oui | louis |
| st<E> | st |
| uis | louis |

| Index B | |
|---|---|
| s | st louis |

Although each of the example indices above maps a feature to a single word/term, it should be appreciated that some features can be mapped to multiple words/terms. For example, in Index B, the prefix "s" may be mapped to both "st louis" and "saint louis". Indices are described in detail in U.S. Pat. Nos. 9,070,090 and 7,856,598.

At 226, approximate string matching may be performed using the one or more indices. Performing approximate string matching may involve comparing features of a first term with features of a second term to compute a similarity score. If the similarity score satisfies (e.g., exceeds) a predetermined threshold value, the terms may be determined to be approximate matches.

The one or more indices may be used to determine whether a particular feature is included in a common word. This enables computing more accurate similarity scores based upon weighting features included in a word from $X_c$ differently than features not included in a word from $X_c$. For example, the n-grams included in a common word may be assigned a penalty weight of 0.25, whereas other features (e.g., prefixes and/or n-grams) may be assigned a full weight of 1.0.

To illustrate, a similarity score for the terms "st paul" and "saint paul" may be computed according to a modified formula for computing the Sorensen-Dice coefficient. The modified formula may account for features of common words by weighting them differently. Weighting features of common words differently increases the accuracy of approximate string matching.

For example, the term "st paul" has the following 8 features: {s, <B>st, st #, t #p, #pa, pau, aul, ul<E>}, where #represents a blank space. The term "saint paul" has the following 11 features: {s, <B>sa, sai, ain, int, nt #, t #p, #pa, pau, aul, ul<E>}. There are 6 features shared by both terms, and of these features, each of the trigrams is assigned a penalty weight of 0.25. Thus, the Sorensen-Dice coefficient for the terms would have been 2*6/(8+11) or 0.63, but assigning penalty weights instead yields a similarity score of 2*5.25/(5.75+6.5) or 0.86, which indicates a greater degree of similarity.

In some embodiments, any of various optimizations may be used to reduce the overhead of computing similarity scores. For example, instead of computing similarity scores for each pair of terms in $X_n$, computing similarity scores for some pairs of terms (e.g., pairs of terms that do not share the same prefix feature) may be avoided using any of the optimization techniques described in U.S. Pat. No. 9,070,090.

At 228, clusters may be formed based upon similarity scores. As mentioned above, similarity scores may be computed to determine whether terms approximately match. For example, similarity scores may be computed to determine that a first term A approximately matches a second term B and that A also approximately matches a third term C. Accordingly, at 228, B and C may be clustered with A. Clustering may be performed using a "fuzzy group-by" operation that is much like a SQL GROUP BY operation for grouping representations based upon similarity scores.

As indicated above, the particular sequence or order of steps depicted in FIGS. 2A-B is not intended to be limiting. In certain alternative embodiments, the steps may be performed in some different order or some steps may also be performed in parallel.

Figure 3:
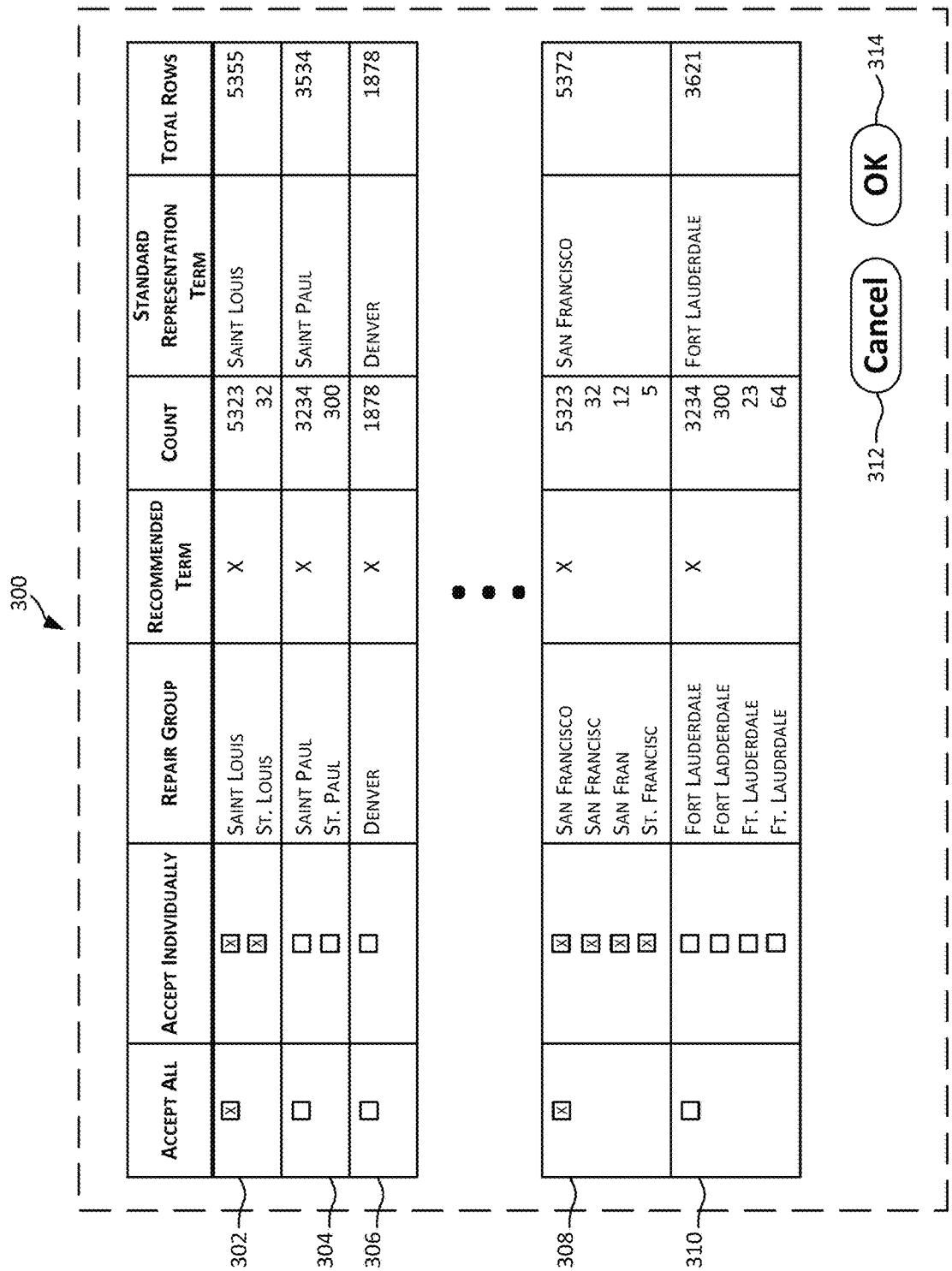
FIG. 3 depicts a graphical user interface, in accordance with some example embodiments.

FIG. 3 depicts a GUI 300 that may be used to solicit user involvement in data standardization. Although the description of FIG. 3 precedes any discussion of FIGS. 4-9, this is not intended to limit GUI 300 to the embodiments associated with FIGS. 1-2.

In the example of FIG. 3, GUI 300 includes data organized in a tabular format comprising rows 302-310. Rows 302-310 may correspond to groups (e.g., clusters) of one or more terms. Similar terms may be grouped together in the same row. For example, row 302 comprises both "Saint Louis" and "St. Louis", because they are sufficiently similar to each other.

The tabular data of FIG. 3 also comprises a number of columns. The "Accept All" column enables a user to specify that all terms in a row are to undergo standardization. For example, in row 302, checking the box in this column causes both "Saint Louis" and "St. Louis" to be selected for standardization. The "Accept Individually" column enables a user to specify individual terms, in a row, to undergo standardization. For example, in row 302, checking the top box in this column causes the term "Saint Louis" to be selected for standardization. The "Repair Group" column indicates which term(s) are grouped for each row. For example, in row 302, the terms "Saint Louis" and "St. Louis" are displayed in this column. The "Recommended Term" column indicates which of the terms in the "Repair Group" column are recommended terms. For example, in row 302, the term "Saint Louis" is marked as the recommended term. The "Count" column indicates a respective number of instances for each term. For example, in row 302, this column indicates that the term "Saint Louis" occurred 5323 times in X and that the term "St. Louis" occurred 32 times in X. The "Standard Representation Term" column indicates a standard representation term for each of rows 302-310. In some embodiments, the standard representation term indicated in this column may be overridden, for example, by manually entering a different term. For example, in row 302, this column indicates that the term "Saint Louis" is the standard representation term for row 302; however, a user may manually enter "St. Louis" to override the default value "Saint Louis". The "Total Rows" column indicates a total number of terms for each of rows 302-310. For example, in row 302, this column indicates that there are 5355 terms in X having a value of "Saint Louis" or "St. Louis".

It should be appreciated that the columns depicted in FIG. 3 are merely provided as examples. One of ordinary skill in the art would recognize many possible variations, alternatives, and modifications. For example, in some implementations, GUI 300 may have more or fewer columns than those shown in FIG. 3, may combine two or more columns, or may have a different arrangement of columns.

GUI 300 also comprises buttons 312-314. A user may select button 312 to avoid standardizing any data. Alternatively, a user may select button 314 to proceed with standardizing any selected data.

Figure 4:
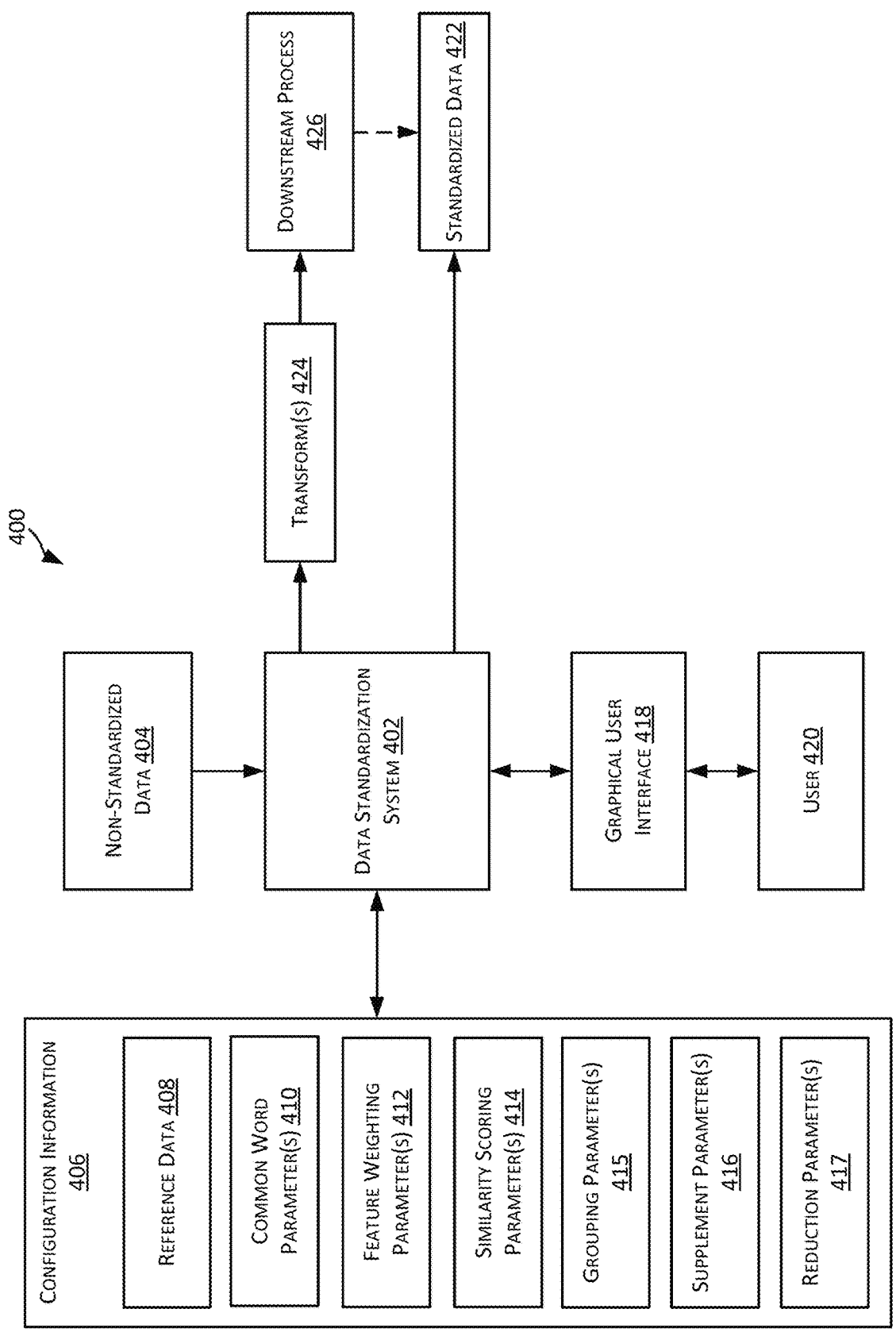
FIG. 4 is a simplified block diagram of a computing environment incorporating an example multi-stage matching embodiment.

FIG. 4 is a simplified block diagram of a computing environment 400 incorporating an example multi-stage matching embodiment. Computing environment 400 may comprise multiple systems communicatively coupled to each other via one or more communication networks (not shown).

The systems in FIG. 4 include a data standardization system 402, which may be communicatively coupled to one or more other systems displaying a graphical user interface 418 and/or executing a downstream process 426. Computing environment 400 depicted in FIG. 4 is merely an example and is not intended to unduly limit the scope of claimed embodiments. One of ordinary skill in the art would recognize many possible variations, alternatives, and modifications. For example, in some implementations, computing environment 400 may have more or fewer systems or components than those shown in FIG. 4, may combine two or more systems, or may have a different configuration or arrangement of systems.

Data standardization system 402 may be similar or identical to data standardization system 102. For example, data standardization system 402 may comprise one or more processors and memory resources and may use one or more storage resources. Accordingly, description applicable to data standardization system 402 is not repeated here for the sake of brevity.

Referring to FIG. 4, data standardization system 402 accesses non-standardized data 404 for processing. Non-standardized data 404 may be accessed from a memory or storage resource included in or coupled to data standardization system 402. Non-standardized data 404 may be similar or identical to non-standardized data 104. Accordingly, description applicable to non-standardized data 404 is not repeated here for the sake of brevity.

In the example of FIG. 4, data standardization system 402 processes non-standardized data 404 using configuration information 406 comprising reference data 408, common word parameter(s) 410, feature weighting parameter(s) 412, similarity scoring parameter(s) 414, grouping parameter(s) 415, supplement parameter(s) 416, and reduction parameter(s) 417. Configuration information 406 may be accessed from a memory or storage resource included in or coupled to data standardization system 402.

As mentioned above, in multi-stage matching embodiments, processing may comprise determining exact matches as well as approximate matches using reference data 408. Conceptually, reference data 408 may serve as a source of possible standard representations of data.

Reference data 408 may comprise information published by web sites, web services, curated knowledge stores, and other sources. In some embodiments, the reference data 408 may comprise a set of terms curated according to data type (e.g., integers, floating point numbers, dates, strings) and/or some other category of data (e.g., names, addresses, telephone numbers, or cities). For example, reference data 408 may comprise names of cities scraped from the website "geonames.org" and may be tagged with metadata indicating that it can be categorized as comprising city names.

As mentioned above, processing may comprise determining approximate matches between terms. For increased accuracy in determining approximate matches between terms, words that occur less frequently may be emphasized over words that occur more frequently.

Common word parameter(s) 410 may be used to determine which words in reference data 408 are to be treated as common words. For example, common word parameter(s) 410 may comprise a predetermined threshold value of frequency that should be exceeded in order for a particular word to be considered a common word.

As mentioned above, increased accuracy may also be achieved by determining approximate matches using an increased level of granularity for performing comparisons. For example, instead of performing comparisons between words as a whole, features (e.g., prefixes and/or n-grams) of words can be compared to determine approximate matches.

Feature weighting parameter(s) 412 may be used to determine how to weight different types of features when performing comparisons. For example, n-gram features (e.g., trigrams comprising three consecutive characters of a term) included in a common word may be assigned a weight having a fixed value of 0.25, whereas n-gram features not included in a common word may be assigned a weight having a fixed value of 1.0. As another example, n-gram features included in a common word may be assigned a weight that varies according to a frequency with which the common word occurs in R.

Similarity scoring parameter(s) 424 may be similar or identical to similarity scoring parameter(s) 112, respectively. Accordingly, description applicable to similarity scoring parameter(s) 424 is not repeated here for the sake of brevity.

As mentioned above, approximate matches may be stored as groupings of variants and possible standard representations. A grouping may be formed if a variant is sufficiently similar to a possible standard representation.

Grouping parameter(s) 415 may be used to determine whether terms are "sufficiently similar" to each other. For example, grouping parameter(s) 415 may comprise a predetermined threshold value that a similarity score should exceed in order for a grouping to be formed.

As mentioned above, approximate matches may be determined in multiple stages. In one stage, a first approximate string matching operation may be performed to determine a set of approximate matches. In another stage, a second approximate string matching operation may be performed to supplement the set of approximate matches.

Supplement parameter(s) 416 may be used to determine the terms on which to perform the second approximate string matching operation. For example, supplement parameter(s) 416 may comprise a predetermined threshold value. Thus, in order for the second approximate string matching operation to be performed on a particular term, the particular term should not be associated with a similarity score that exceeds this predetermined threshold value.

However, determining approximate matches in multiple stages may result in a large set of approximate matches. For example, the set of approximate matches may include a set of groupings that share the same variant. Thus, one or more groupings may be removed from the set of groupings.

Reduction parameter(s) 417 may be used to determine which, if any, groupings to remove from the set of approximate matches. For example, reduction parameter(s) 417 may comprise a rule specifying removal of groupings having comparatively low similarity scores, a maximum number of groupings permitted for each set of groupings sharing a variant, and/or any other predetermined criterion.

Processing non-standardized data 404 may facilitate selection of standard representations for the non-standardized data 404. As with the embodiment depicted in FIG. 1, selection of standard representations may be performed manually or automatically based upon recommended terms.

GUI 418, user 420, standardized data 422, transform(s) 424, and downstream process 426 are similar or identical to GUI 118, user 120, standardized data 122, transform(s) 124, and downstream process 126, respectively. Accordingly, description applicable to GUI 418, user 420, standardized data 422, transform(s) 424, and downstream process 426 is not repeated here for the sake of brevity.

Computing environment 400 depicted in FIG. 4 is merely an example and is not intended to be limiting. One of ordinary skill in the art would recognize many possible variations, alternatives, and modifications. For example, in some implementations, computing environment 400 may have more or fewer components than those shown in FIG. 4, may combine two or more components, or may have a different configuration or arrangement of components. While only one data standardization system 402 is depicted in FIG. 4 for purposes of simplicity, this is not intended to be limiting.

The infrastructure described above can be implemented in various different environments including a cloud environment (could be various types of clouds including private, public, and hybrid cloud environments), on-premises environment, a hybrid environment, and the like.

Figure 5A:
FIGS. 5A-C correspond to a flowchart depicting processing according to an example multi-stage matching embodiment.
Figure 5B:
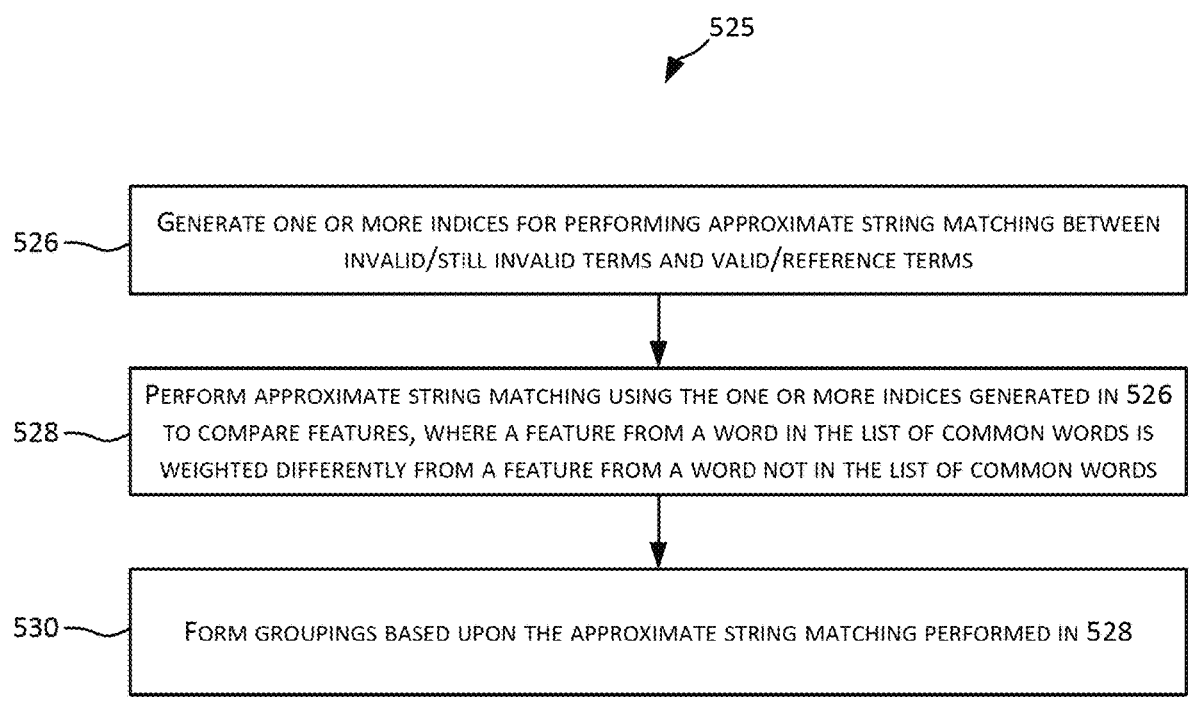
Figure 5C:
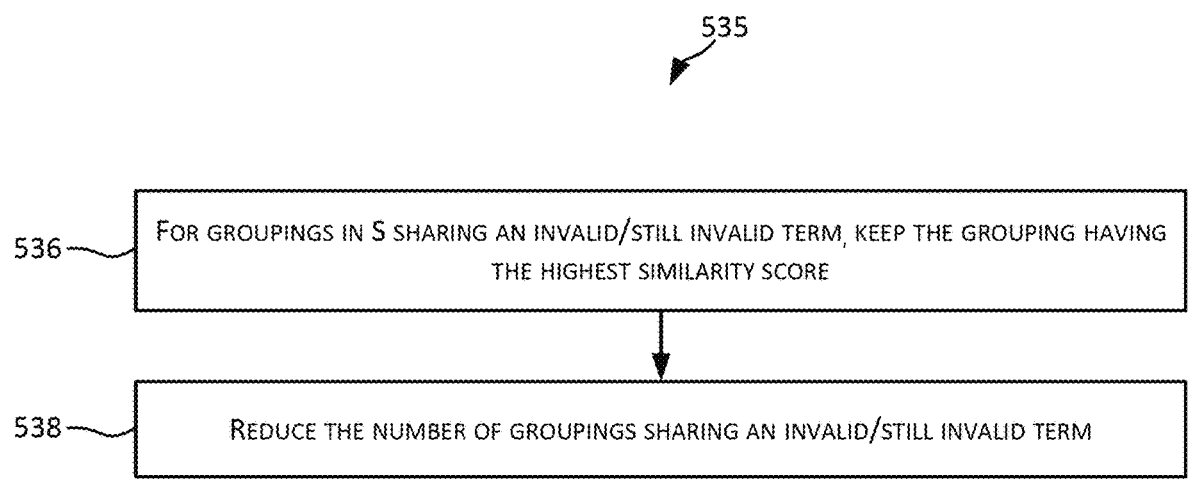

FIGS. 5A-C correspond to a flowchart 500 depicting processing according to an example multi-stage embodiment. The processing depicted in FIGS. 5A-C may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIGS. 5A-C and described below is intended to be illustrative and non-limiting. Although FIGS. 5A-C depict the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 4, the processing depicted in FIGS. 5A-C may be performed by data standardization system 402.

As shown in FIG. 5A, a set of to-be-standardized data (referred to herein as "X") may be received at 502. The data X may comprise multiple elements or terms, each element or term comprising one or more words. In some embodiments, each element or term is a string comprising one or more characters. In some alternative embodiments, each element or term may be some structure other than a string.

In certain embodiments, the data X may correspond to entries in a column of a table (e.g., a database table). For example, a table may be configured for string information for a set of employees. Such a table may have multiple columns including a column for entering a city name where each employee resides. Each element in X may correspond to a row entry in the City Name column in the table. An example of such a column with sample entries is shown below:

| Column B (City Name) |
| --- |
| Potomac |
| Potomack |
| Potowmackk |
| Saint Louis |
| Saint Paul |

| Column B (City Name) |
| --- |
| S Louis |
| Louisville |

At 504, reference data (referred to herein as "R") may be determined for use in standardizing data in X. This determination may involve identifying reference data that includes or is likely to include at least some of the terms in X. For example, R may be selected for performing standardization on X based upon determining that X and R both comprise terms of the same category (e.g., names of cities). Techniques for category-based determination of reference data is described in U.S. patent application Ser. No. 14/864,485 filed Sep. 24, 2015, and titled "Techniques for Similarity Analysis and Data Enrichment Using Knowledge Sources", the entirety of which is incorporated herein by reference.

For example, R may be comprise the following column of terms in a database table:

| Column C |
| --- |
| Denver |
| Potomac |
| Potowmack |
| Saint Louis |
| Saint Paul |
| Louisville |

Typically, R would include significantly more terms. However, R is shown here as having fewer terms for the sake of providing a clear example.

At 506, an exact string matching operation may be performed between terms in X and terms in R. Exact matches may be included in a set of exact matches (referred to herein as "valids"). Other terms in X may be included in a set of non-exact matches (referred to herein as "invalids"). Valids and invalids may be represented as $X_v$ and $X_i$, respectively, to indicate that they are each subsets of X.

For example, $X_v$ may include "Potomac", "Saint Louis", "Saint Paul", and "Louisville". Thus, $X_i$ may include "Potomack", "Potowmackk", and "S Louis".

At 508, a set of common words (referred to herein as "$R_c$") may be determined from R. This may involve determining occurrence frequencies for words in R. Here, an occurrence frequency for a particular word indicates the number of occurrences of the word in R.

Determining $R_c$ may involve generating $R_w$. $R_w$ may be a set of individual words generated based upon tokenizing R. For example, the term "Saint Louis" may be tokenized into the individual words "Saint" and "Louis". In some embodiments, $R_w$ may be a set of unique words occurring in R. Occurrence frequencies may then be determined for different words in $R_w$.

As indicated above, elements or terms in X may be tokenized to identify individual words. In some embodiments, separators may be used to tokenize a term into words. For example, if a space character is a separator, then a term such as "Saint Louis" is tokenized into two words "Saint" and "Louis". A separator is not included in a word resulting from a tokenization operation. Other characters (e.g., punctuation marks such as a comma) may be used as separators in certain embodiments.

In some embodiments, the occurrence frequencies may be stored in $R_w$ such that each element of $R_w$ comprises a word and a frequency value. For example, $R_w$ may comprise the following list: {("Denver", 1), ("Potomac", 1), ("Potowmack", 1), ("Saint", 2), ("Louis", 1), ("Paul", 1), ("Louisville", 1)}.

$R_c$ may be determined based upon comparing occurrence frequencies to a predetermined threshold value. Various different formats may be used to represent the predetermined threshold value. In some embodiments, the threshold may be defined as a number of words, as a percentage of the words in X, and the like. For example, if the predetermined threshold value is 20%, then $R_c$ may comprise the word "Saint", which has an occurrence frequency of 25%.

At 510, an approximate string matching operation may be performed between terms in $X_i$ and terms in $X_v$. This may involve computing similarity scores between terms. Computing similarity scores is described in greater detail below with reference to FIG. 5B.

Similarity scores may be used to determine terms that are sufficiently similar (i.e., are approximate matches) as to warrant inclusion in a set of approximate matches (referred to herein as a suggestion set "S"). This determination may involve comparing similarity scores to a first threshold value. For example, if this predetermined threshold value is 0.50 and if the terms "Potomack" and "Potomac" have a similarity score of 0.82, then the terms may be included in S.

S may comprise approximate matches stored as groupings. Each grouping may be a tuple comprising a variant and a possible standard representation. As of 510, each grouping may be a tuple comprising a term in X, and a term in $X_v$. For example, the terms "Potomack" and "Potomac" may be stored as the grouping ("Potomack", "Potomac").

In some embodiments, each grouping may also comprise a similarity score. For example, the terms "Potomack" and "Potomac" may be stored as the grouping ("Potomack", "Potomac", 0.82). As described below with reference to FIG. 5C, storing similarity scores in groupings may facilitate reducing the size of S.

Similarity scores may also be used to determine terms that are sufficiently dissimilar as to warrant inclusion in a set of "still invalids" (referred to herein as "$X_{si}$"). This determination may involve comparing similarity scores to a second threshold value. For example, if this predetermined threshold value is 0.80 and if the terms "Potowmackk" and "Potomac" have a similarity score of 0.53, then the variant "Potowmackk" may be included in $X_{si}$.

In some embodiments, there may be some overlap between S and $X_{si}$. More specifically, terms in $X_i$ having similarity scores that fall between the first threshold value and the second threshold value may be included in both S and $X_{si}$. "Potowmackk" is an example of such a term. This overlap enables keeping a low-similarity match between a term in $X_i$ and a term in $X_v$ while, as described below, checking for a better match between the term in $X_i$ and a term in R.

At 512, an approximate string matching operation may be performed between terms in $X_{si}$ and at least some of the terms in R. This may involve computing similarity scores, which is described below with reference to FIG. 5B.

Similarity scores may be used to determine groupings with which to supplement S. This determination may involve comparing similarity scores to a predetermined threshold value. For example, if the predetermined threshold value is 0.50 and if the terms "Potowmackk" and "Potowmack" have a similarity score of 0.86, then the grouping ("Potowmackk", "Potowmack") may be included in S.

In embodiments involving an overlap between S and $X_{si}$, duplicate groupings may result from comparing Xs, with R in its entirety. To avoid duplicate groupings, $X_{si}$ may be compared with only those terms in R that were excluded from $X_v$. Alternatively, Xs, may be compared with R in its entirety, but duplicate groupings may be avoided in at least two ways that may not be mutually exclusive. For example, before adding a grouping to S, a determination may be made as to whether the grouping already exists in S. If so, the grouping may not be added to S; if not, the grouping may be added to S. Additionally or alternatively, after adding a grouping to S, any duplicate groupings may be detected and removed from S.

At 514, one or more recommended terms may be identified from S based upon similarity scores. The one or more recommended terms may comprise terms from $X_v$ and/or R. For example, S may include the groupings ("Potowmackk", "Potomac", 0.53) and ("Potowmackk", "Potowmack", 0.86), which share the same variant "Potowmackk". Since, the second grouping has a higher similarity score, "Potowmack" from the second grouping may be selected to be a recommended term for the variant "Potowmackk". The selection may be manifested by the removal of the first grouping from S. Techniques related to the selection of recommended terms are described in greater detail below with reference to FIG. 5C.

At 516, one or more standard representation terms may be identified for the groupings in S. In the default case, the one or more recommended terms identified in 514 are to be used as the one or more standard representation terms. However, in certain embodiments, a user has the ability to specifically indicate that a term other than a recommended term is to be used as a standard representation term.

In some embodiments, at 518 as part of identifying the one or more standard representation terms, one or more standardization recommendations may be outputted to a user. The one or more standardization recommendations may comprise the one or more recommended terms identified in 514. For example, the one or more standardization recommendations may be displayed to the user via a GUI, such as GUI 300 depicted in FIG. 3.

At 520, the user may provide input identifying which term(s) are to be used as the one or more standard representation terms for the groupings in S. The user input may indicate that a recommended term is to be used as a standard representation term or that a different term (e.g., other than a recommended term) is to be used as a standard representation term. For example, the different term provided by the user may be a term, from the terms in S, other than the recommended term. Or the different term may be some other term.

To illustrate, the terms "Potomac" and "S Louis" may each be recommended terms. A user may provide input confirming that the recommended term "Potomac" should be used as a standard representation term. However, the user may also provide input selecting "St. Louis" (overriding the recommended term "S Louis") as a standard representation term. The data standardization system may then identify the standard representation terms based upon the user inputs in 520.

In certain embodiments, at 522, the one or more recommended terms identified in 514 may be automatically selected as the one or more standard representation terms. No user intervention may be needed in this case.

At 524, standardization of X is performed using the one or more standard representation terms identified in 516. In certain embodiments, standardization involves replacing occurrences of variant terms in X with the one or more standard representation terms. For example, all instances of the terms "Potomack" and "Potowmackk" in X may be replaced with the standard representation term "Potomac". In this manner, the to-be-standardized data X received in 502 is modified to generate standardized data. In some embodiments, the to-be-standardized data X may be itself modified to generate standardized data. In some other embodiments, the standardized data may be created separate from the to-be-standardized data. In some embodiments, instead of modifying the data, functions may be created and associated with data X such that when data X is consumed by a consumer, occurrences in X of certain terms are transformed to the appropriate standard representation term.

As described above, in 510 and 512 of FIG. 5A, an approximate string matching operation may be performed. FIG. 5B depicts a simplified flowchart 525 depicting processing that may be performed as part of 510 and/or 512 of FIG. 5A in certain embodiments.

In some embodiments, terms in X and/or R may be normalized to produce one or more sets of normalized terms $X_n$ and/or R. Normalization may involve converting uppercase letters into lower-case letters, stripping punctuation marks, converting Unicode whitespace characters into plain spaces, and/or removing consecutive spaces.

At 526, one or more indices may be generated for performing approximate string matching (e.g., between $X_i$ and $X_v$ or between $X_{si}$ and R). Each index may be a mapping between features and words/terms (e.g., in R or $R_n$) that include the features. For example, a first index may map n-grams to words, and a second index may map prefixes of length m to terms, where n and m can have any value greater than or equal to 1.

At 528, approximate string matching may be performed using the one or more indices. Performing approximate string matching may involve comparing features of a first term with features of a second term to compute a similarity score. If the similarity score satisfies (e.g., exceeds) a predetermined threshold value, the terms may be determined to be approximate matches.

The one or more indices may be used to determine whether a particular feature is included in a common word. This enables computing more accurate similarity scores based upon weighting features included in a word from $R_n$ differently than features not included in a word from $R_c$. For example, the n-grams included in a common word may be assigned a penalty weight of 0.25, whereas other features (e.g., prefixes and/or n-grams) may be assigned a full weight of 1.0.

In some embodiments, any of various optimizations may be used to reduce the overhead of computing similarity scores. For example, instead of computing similarity scores for each $X_i$-to-$X_v$ pairing, computing similarity scores for some pairings (e.g., pairings that do not share the same prefix feature) may be avoided using any of the optimization techniques described in U.S. Pat. No. 9,070,090.

At 530, groupings may be formed based upon similarity scores. As mentioned above, similarity scores may be computed to determine whether terms approximately match. Forming groupings may be performed using a "fuzzy group-by" operation that is much like a SQL GROUP BY operation for grouping representations based upon similarity scores.

As described above, in 514 of FIG. 5A, one or more recommended terms may be identified. FIG. 5C depicts a simplified flowchart 535 depicting processing that may be performed as part of 514 in FIG. 5A in certain embodiments.

At 536, the number of groupings in S may be reduced based upon similarity scores. As mentioned above, S may comprise multiple groupings that share the same variant (e.g., a term in $X_i$, a term in $X_{si}$). Similarity scores for the multiple groupings may be compared to determine which of the multiple groupings to keep as a recommend term. For example, a recommended term may be selected from the grouping with the highest similarity score. Any groupings that do not include a recommended term may be removed from S.

At 538, the number of groupings in S may be further reduced in some embodiments. This may be achieved based upon any number of various predetermined criteria for removing a grouping from a set of groupings that share the same variant (e.g., a term in $X_i$, a term in $X_{si}$). Examples of the predetermined criteria include, without limitation, a rule specifying removal of groupings having similarity scores outside a predetermined score range of the highest similarity score and/or a rule specifying a maximum number of groupings that can be retained for each set of grouping sharing the same variant (e.g., a term in $X_i$, a term in $X_{si}$).

As indicated above, the particular sequence or order of steps depicted in FIGS. 5A-C is not intended to be limiting. In certain alternative embodiments, the steps may be performed in some different order or some steps may also be performed in parallel. For example, while steps 506-508 are shown as occurring in a particular order in flowchart 500 in FIG. 5A, this is not intended to be limiting. In alternative embodiments, these can occur in any order. In yet other embodiments, step 508 may occur before step 506 or steps 506-508 may be performed in parallel.

Figure 9:
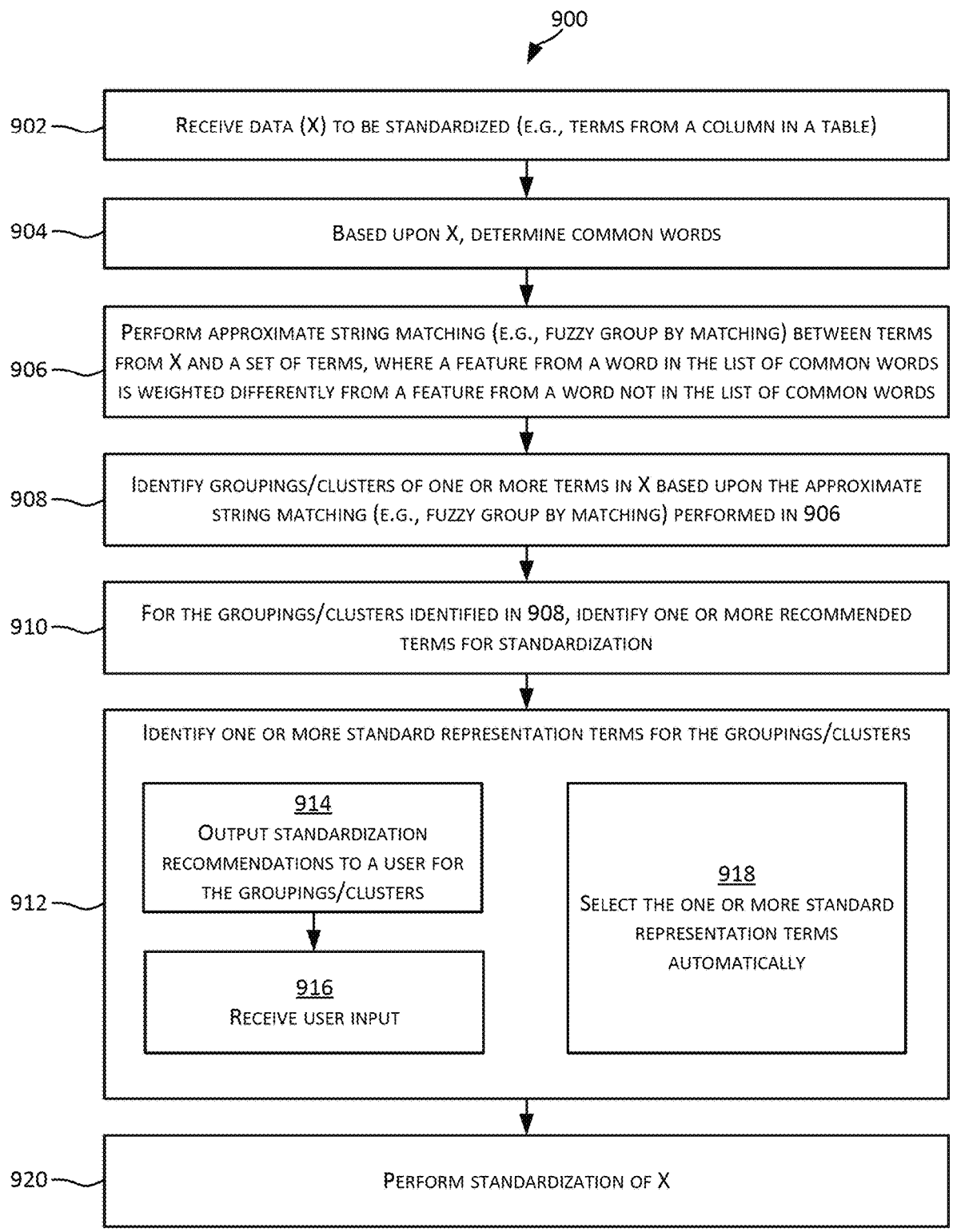
FIG. 9 is a simplified flowchart depicting processing according to some example embodiments.

FIG. 9 is a simplified flowchart depicting processing according to some example embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIG. 1 and/or FIG. 4, the processing depicted in FIG. 9 may be performed by data standardization system 102 and/or 402.

At 902, a set of to-be-standardized data (referred to herein as "X") may be received. For example, X may comprise a column of terms in a database table.

At 904, a set of common words may be determined based upon X. In some embodiments (e.g., dictionary-free embodiments), the set of common words may comprise words that occur frequently in X. In some embodiments (e.g., multi-stage matching embodiments), the set of common words may comprise words that occur frequently in reference data R.

At 906, an approximate string matching operation may be performed between at least some terms in X and a set of terms. In some embodiments (e.g., dictionary-free embodiments), the set of terms may be X itself. In some embodiments (e.g., multi-stage matching embodiments), the set of terms may be a subset of X (e.g., $X_v$) in one stage, and the set of terms may be R in another stage.

Performing the approximate string matching operation may involve feature comparison. Furthermore, feature comparison may involve weighting features from common words differently than features from non-common words.

In some embodiments (e.g., multi-stage matching embodiments), the approximate string matching operation may be performed after an exact string matching operation is performed between X and R.

At 908, groupings or clusters of one or more terms may be identified based upon the approximate string matching operation performed in 906. In some embodiments (e.g., dictionary-free embodiments), one or more terms may be clustered according to similarity. In some embodiments (e.g., multi-stage matching embodiments), similar terms may be included in a grouping.

At 910, one or more recommended terms are identified for performing standardization. In some embodiments (e.g., dictionary-free embodiments), a recommended term may be identified from each cluster. In some embodiments (e.g., multi-stage matching embodiments), a recommended term may be identified from a set of groupings sharing the same variant.

At 912, one or more standard representation terms are identified for performing standardization. In the default case, a recommended term identified in 910 is to be used as a standard representation term. However, in certain embodiments, a user has the ability to specifically indicate that a term other than the recommended term is to be used as the standard representation term.

In some embodiments, at 914, as part of identifying the one or more standard representation terms, one or more standardization recommendations may be outputted to a user. The one or more standardization recommendations may comprise the one or more recommended terms identified in 910. For example, one or more standardization recommendations may be displayed to the user via a GUI, such as GUI 300 depicted in FIG. 3.

At 916, the user may provide input identifying which term(s) are to be used as the one or more standard representation terms. The user input may indicate that a recommended term is to be used as a standard representation term or that a different term (e.g., other than the recommended term) is to be used as a standard representation term.

In certain embodiments, at 918, the one or more recommended terms identified in 910 may be automatically selected as the one or more standard representation terms. No user intervention may be needed in this case.

At 920, standardization of X is performed based upon one or more recommended terms identified in 910. In certain embodiments, standardization involves, replacing occurrences of variant terms in X with standard representation terms. For example, all instances of the term "St. Louis" in X may be replaced with the standard representation term "Saint Louis". In this manner, the to-be-standardized data X received in 902 is modified to generate standardized data. In some embodiments, the to-be-standardized data X may be itself modified to generate standardized data. In some other embodiments, the standardized data may be created separate from the to-be-standardized data. In some embodiments, instead of modifying the data, functions may be created and associated with data X such that when data X is consumed by a consumer, for each cluster, occurrences in X of the terms in the cluster are transformed to the standard representation term for the cluster.

As indicated above, the particular sequence or order of steps depicted in FIG. 9 is not intended to be limiting. In certain alternative embodiments, the steps may be performed in some different order or some steps may also be performed in parallel.

Figure 6:
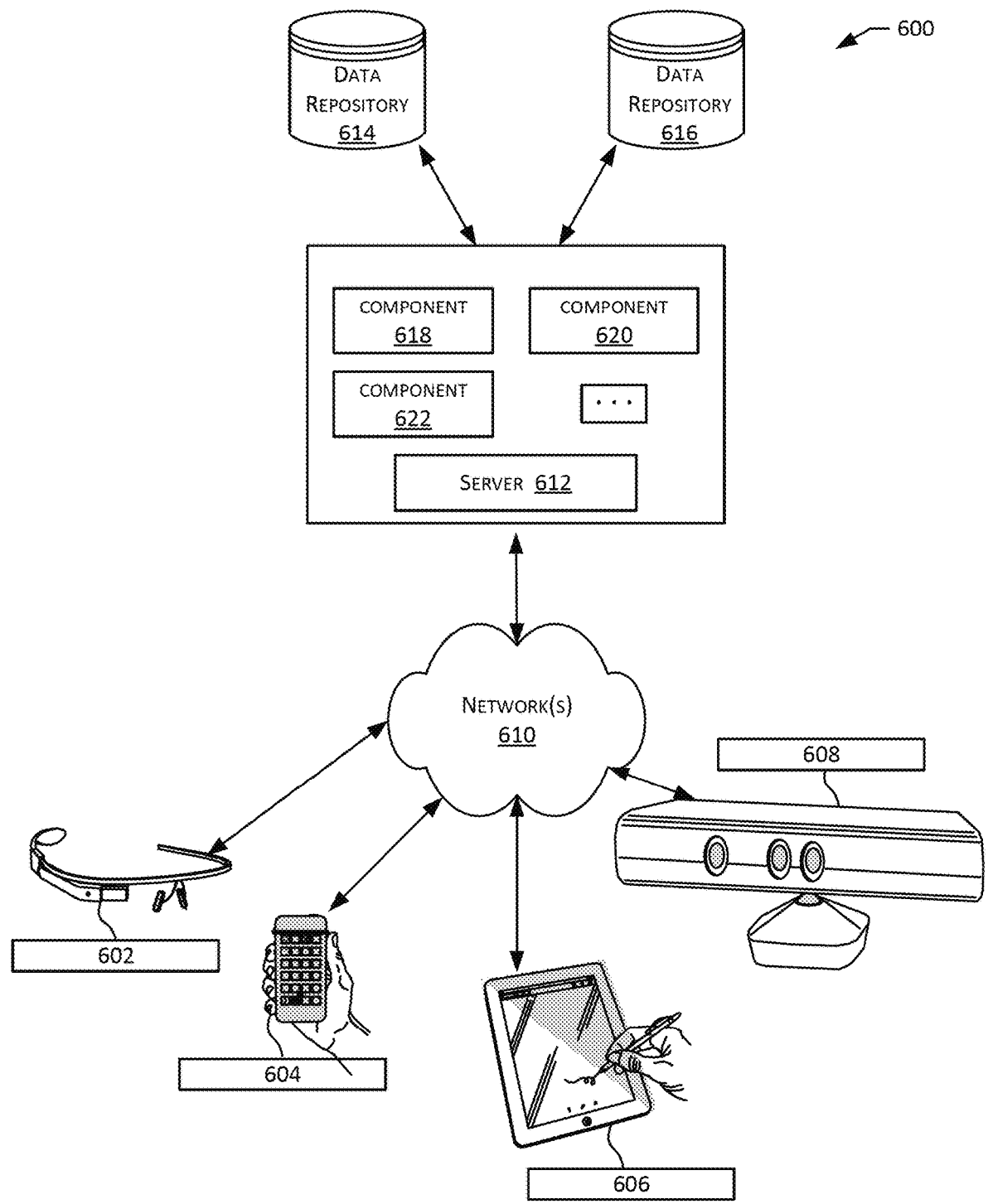
FIG. 6 is a simplified diagram of a distributed system for implementing some example embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable standardization of data. In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to select a standardized representation of a term in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information comprising to-be-standardized data, reference data, and/or standardized data. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
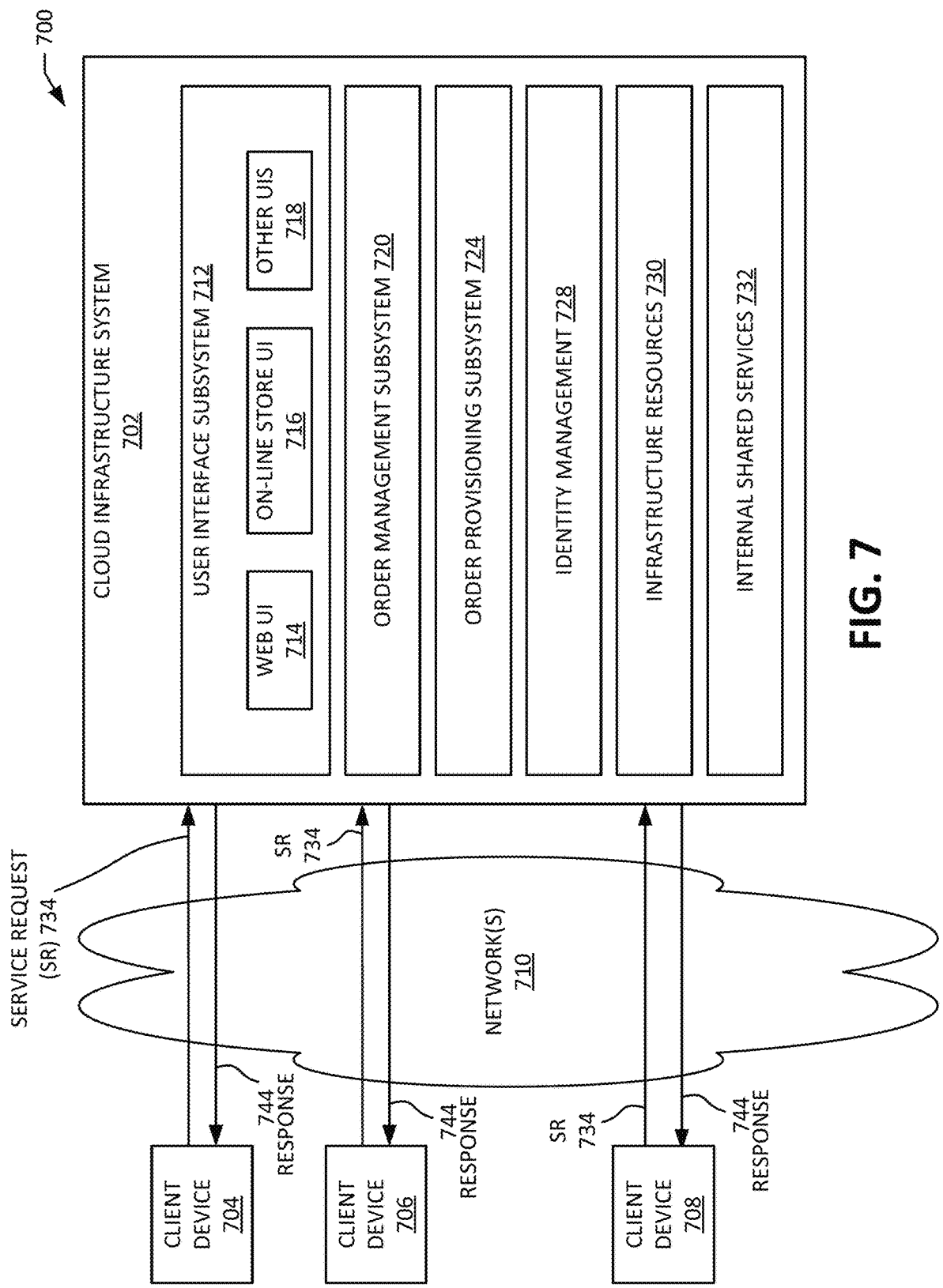
FIG. 7 is a simplified block diagram of a cloud-based system environment in which various storage-related services may be offered as cloud services, in accordance with some example embodiments.

In certain embodiments, the data standardization-related functionalities described in this disclosure may be offered as services via a cloud environment. FIG. 7 is a simplified block diagram of a cloud-based system environment in which various data standardization-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, cloud infrastructure system 702 may perform processing to standardize data. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a data standardization-related service described in this disclosure.

In some embodiments, the processing performed by cloud infrastructure system 702 for providing data standardization-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for categorizing to-be-standardized data. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a data standardization-related service offered by cloud infrastructure system 702. As part of the order, the customer may provide information identifying to-be-standardized data.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the data standardization-related service, the response may include a prompt to identify to-be-standardized data.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
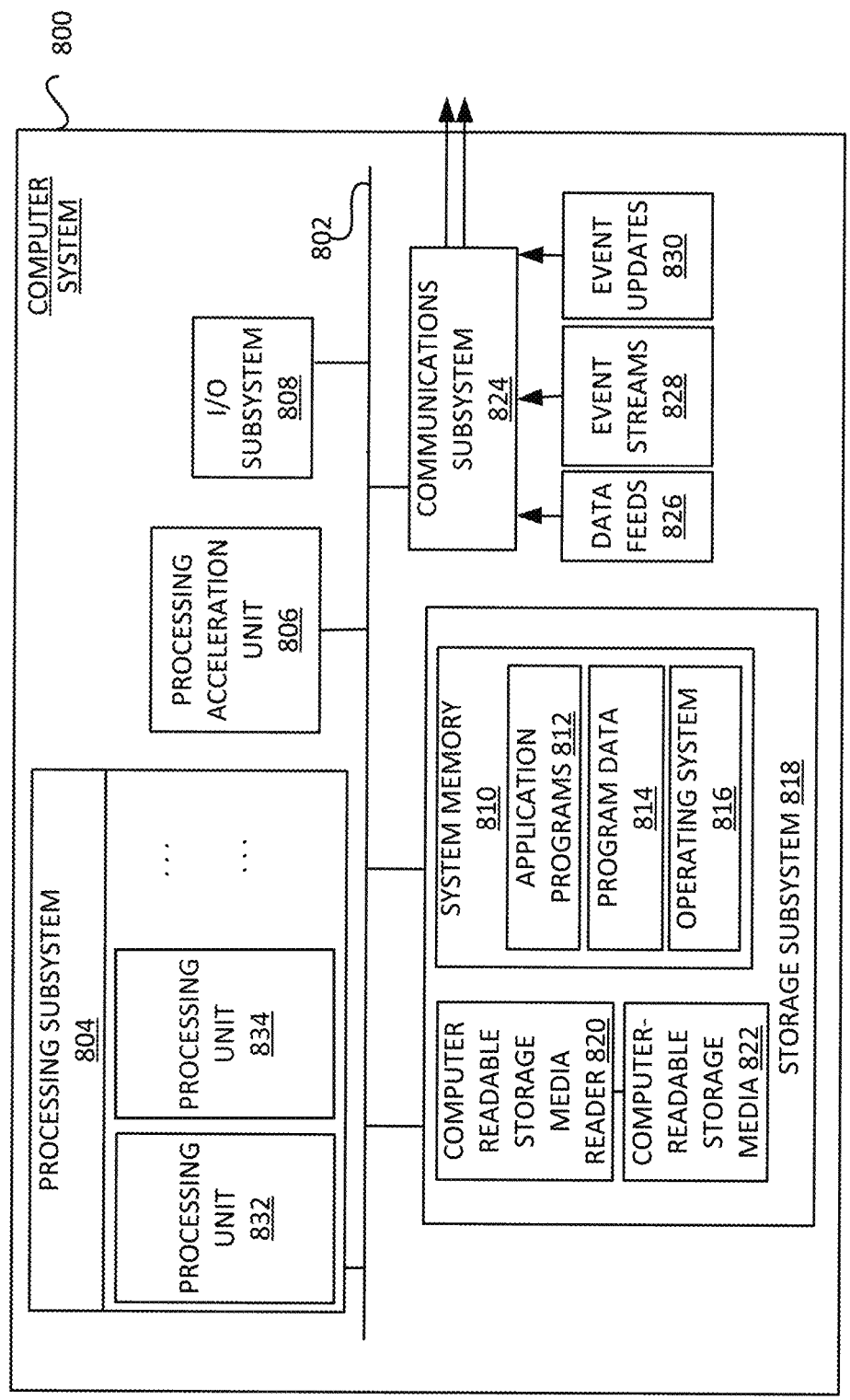
FIG. 8 depicts an example computer system that may be used to implement some example embodiments.

FIG. 8 illustrates an example computer system 800 that may be used to implement certain embodiments. For example, in some embodiments, computer system 800 may be used to implement any of the data standardization system, servers, and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to communicate data standardization-related recommendations to a client device.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A non-transitory computer-readable memory storing a plurality of instructions executable by one or more processors, the plurality of instructions comprising instructions that when executed by the one or more processors cause the one or more processors to perform processing comprising:
   receiving, by a data standardization system, to-be-standardized data comprising a plurality of terms, wherein each term comprises one or more words;
   determining, by the data standardization system, frequencies of words occurring in the to-be-standardized data;
   identifying, by the data standardization system, a set of one or more common words based upon the frequencies of words, wherein identifying the set of one or more common words comprises including, in the set of one or more common words, any word that occurs in the to-be-standardized data with a frequency that exceeds a predetermined threshold value;
   determining, by the data standardization system, similarities between the terms in the to-be-standardized data by performing an approximate string matching operation between the terms in the to-be-standardized data, wherein performing the approximate string matching operation between any two terms in the to-be-standardized data comprises matching features extracted from the two terms, and wherein the matching features comprises using a first weight for the matching when a feature corresponds to a common word in the set of one or more common words and using a second weight for the matching when a feature corresponds to a word not in the set of one or more common words, wherein the first weight is different from the second weight;
   determining, by the data standardization system based upon the similarities between the terms in the to-be-standardized data, a plurality of clusters, each cluster in the plurality of clusters comprising one or more terms from the to-be-standardized data;
   for each cluster in the plurality of clusters:
      identifying, by the data standardization system, a recommended term for the cluster from the one or more terms in the cluster; and
      identifying, by the data standardization system, a standard representation term for the cluster; and
   performing, by the data standardization system, standardization of the to-be-standardized data using standard representation terms identified for the plurality of clusters.

2. The non-transitory computer-readable memory of claim 1 wherein identifying the standard representation term for each cluster in the plurality of clusters comprises:
   identifying, for a first cluster in the plurality of clusters, a recommended term for the first cluster as the standard representation term for the first cluster.

3. The non-transitory computer-readable memory of claim 1 wherein identifying the standard representation term for each cluster in the plurality of clusters comprises:
   identifying, for a first cluster in the plurality of clusters, the standard representation term for the first cluster that is different from a recommended term for the first cluster.

4. The non-transitory computer-readable memory of claim 1, wherein identifying the standard representation term for each cluster in the plurality of clusters comprises:
   displaying for a first cluster in the plurality of clusters:
      a plurality of terms included in the first cluster, and
      information identifying a recommended term of the first cluster; and
   receiving user input indicative of a different term to be used as the standard representation term for the first cluster, wherein the different term is different from the recommended term for the first cluster.

5. The non-transitory computer-readable memory of claim 1, wherein identifying the standard representation term for each cluster in the plurality of clusters comprises:
   displaying for a first cluster in the plurality of clusters:
      a plurality of terms included in the first cluster, and
      information identifying a recommended term for the first cluster; and
   receiving user input indicative of the recommended term for the first cluster to be used as the standard representation term for the first cluster.

6. The non-transitory computer-readable memory of claim 1 wherein performing the standardization comprises:
   for a first cluster in the plurality of clusters, transforming occurrences in the to-be-standardized data of a first term included in the first cluster with the standard representation term identified for the first cluster, wherein the first term is different from the standard representation term for the first cluster.

7. The non-transitory computer-readable memory of claim 1 wherein performing the standardization comprises:
   for a first cluster in the plurality of clusters, providing a first function for transforming occurrences, in the to-be-standardized data, of terms in the first cluster to the standard representation term identified for the first cluster.

8. The non-transitory computer-readable memory of claim 1 wherein the first weight is set to a predetermined fixed value.

9. The non-transitory computer-readable memory of claim 1 wherein the first weight is set to a value determined based upon a frequency with which the common word occurs in the to-be-standardized data.

10. The non-transitory computer-readable memory of claim 1 wherein the feature is an n-gram.

11. The non-transitory computer-readable memory of claim 1 wherein identifying the recommended term for each cluster in the plurality of clusters comprises:
- computing, by the data standardization system, a set of recommendation metrics for terms in the cluster, wherein a recommendation metric for a term in the cluster is computed based upon a length of the term and a frequency with which the term occurs in the to-be-standardized data; and
- using, by the data standardization system, the set of recommendation metrics to determine the recommended term for the cluster.

12. The computer-readable memory according to claim 1, wherein identifying the recommended term comprises:
- computing a candidate score for the one or more terms in the cluster; and
- selecting a term from the one or more terms in the cluster having a highest candidate score as the recommended term for the cluster.

13. The computer-readable memory according to claim 1, wherein the standard representation term is the recommended term identified for the cluster or a term that is different from the recommended term and specified by a user.

14. The computer-readable memory according to claim 1, wherein performing the standardization comprises replacing occurrences of terms in the cluster in the to-be-standardized data with the standard representation term for the cluster.

15. A non-transitory computer-readable memory storing a plurality of instructions executable by one or more processors, the plurality of instructions comprising instructions that when executed by the one or more processors cause the one or more processors to perform processing comprising:
- receiving, by a data standardization system, to-be-standardized data comprising a plurality of terms, wherein each term comprises one or more words;
- determining, by the data standardization system, reference data to be used for standardizing the to-be-standardized data, wherein determining the reference data to be used comprises identifying reference data that includes at least some of the terms in the to-be-standardized data;
- determining, by the data standardization system, a set of one or more exact matches and a set of non-exact matches by performing an exact string matching operation between the to-be-standardized data and the reference data;
- determining, by the data standardization system, frequencies of words occurring in the reference data;
- identifying, by the data standardization system, a set of one or more common words based upon the frequencies of words, wherein identifying the set of one or more common words comprises including, in the set of one or more common words, any word that occurs in the reference data with a frequency that exceeds a predetermined threshold value; determining, by the data standardization system, similarities between terms in the set of non-exact matches and terms in the set of one or more exact matches by performing an approximate string matching operation between the terms in the set of non-exact matches and the terms in the set of one or more exact matches, wherein performing the approximate string matching operation between a term in the set of non-exact matches and a term in the set of one or more exact matches comprises matching features extracted from the term in the set of non-exact matches against features extracted from the term in the set of one or more exact matches, and wherein the matching features comprises using a first weight for the matching when a feature corresponds to a common word in the set of one or more common words and using a second weight for the matching when a feature corresponds to a word not in the set of one or more common words, wherein the first weight is different from the second weight;
- determining, by the data standardization system based upon the similarities between the terms in the set of non-exact matches and the terms in the set of one or more exact matches, a suggestion set comprising a plurality of groupings, each grouping in the plurality of groupings comprising terms that share a similarity metric exceeding a first threshold value;
- identifying, by the data standardization system based upon the similarities between the terms in the set of non-exact matches and the terms in the set of one or more exact matches, a subset of the set of non-exact matches comprising one or more terms included in a grouping, of the plurality of groupings, that has a similarity metric not exceeding a second threshold value;
- determining, by the data standardization system, similarities between terms in the subset of the set of non-exact matches and terms in the reference data by performing an approximate string matching operation between the terms in the subset of the set of non-exact matches and the terms in the reference data, wherein performing the approximate string matching operation between a term in the subset of the set of non-exact matches and a term in the reference data comprises matching features extracted from the term in the subset of the set of non-exact matches against features extracted from the term in the reference data, and wherein the matching features comprises using the first weight for the matching when a feature corresponds to a common word in the set of one or more common words and using the second weight for the matching when a feature corresponds to a word not in the set of one or more common words;
- determining, by the data standardization system based upon the similarities between the terms in the subset of the set of non-exact matches and the terms in the reference data, one or more additional groupings to include in the suggestion set;
- identifying, by the data standardization system, one or more recommended terms from terms in the suggestion set;
- identifying, by the data standardization system, one or more standard representation terms for the suggestion set; and
- performing, by the data standardization system, standardization of the to-be-standardized data using the one or more standard representation terms identified for the suggestion set.

16. The non-transitory computer-readable memory of claim 15, wherein identifying the one or more recommended terms comprises:
- identifying, by the data standardization system, a set of groupings sharing a term from the set of non-exact matches; and
- identifying, by the data standardization system, a grouping having a highest similarity metric of the set of groupings.

17. The non-transitory computer-readable memory of claim 15 wherein identifying one or more standard representation terms for the suggestion set comprises:
identifying a recommended term of the one or more recommended terms as the standard representation term of the one or more standard representation terms.

18. The non-transitory computer-readable memory of claim 15 wherein identifying one or more standard representation terms for the suggestion set comprises:
identifying a standard representation term of the one or more standard representation terms that is different from a recommended term of the one or more recommended terms.

19. The non-transitory computer-readable memory of claim 15 wherein the first weight is set to a predetermined fixed value.

20. The non-transitory computer-readable memory of claim 15 wherein the first weight is set to a value determined based upon a frequency with which the common word occurs in the reference data.

21. The computer readable memory according to claim 15, wherein identifying the one or more recommended terms from the terms in the suggestion set comprises identifying a set of groupings sharing a term from the set of non-exact matches and identifying a grouping having a highest similarity metric of the set of groupings.

22. The computer readable memory according to claim 15, wherein a standard representation term is a recommended term identified from the terms in the suggestion set or a term that is different from the recommended term and specified by a user.

23. The computer readable memory according to claim 15, wherein performing the standardization comprises transforming occurrences in the to-be-standardized data of a first term with a standard representation term identified for the plurality of groupings or clusters.

24. A non-transitory computer-readable memory storing a plurality of instructions executable by one or more processors, the plurality of instructions comprising instructions that when executed by the one or more processors cause the one or more processors to perform processing comprising:
receiving, by a data standardization system, to-be-standardized data comprising a plurality of terms, wherein each term comprises one or more words;
identifying, by the data standardization system, a set of one or more common words based upon the to-be-standardized data;
determining, by the data standardization system, similarities between the terms in the to be-standardized data and terms in a set of terms of a subset of the to-be-standardized data or a subset of reference data by performing an approximate string matching operation between the terms in the to-be-standardized data and the terms in the set of terms, wherein performing the approximate string matching operation between a term in the to-be-standardized data and a term in the set of terms comprises matching features extracted from the term in the to-be-standardized data against features extracted from the term in the set of terms, and wherein the matching features comprises using a first weight for the matching when a feature corresponds to a word in the set of one or more common words and using a second weight for the matching when a feature corresponds to a word not in the set of one or more common words, wherein the first weight is different from the second weight;
determining, by the data standardization system based upon the similarities between the terms in the to-be-standardized data and the terms in the set of terms, a plurality of groupings or clusters, each grouping or cluster in the plurality of groupings or clusters comprising one or more terms from the to-be-standardized data;
identifying, by the data standardization system, one or more recommended terms from terms in the plurality of groupings or clusters;
identifying, by the data standardization system, one or more standard representation terms for the plurality of groupings or clusters; and
performing, by the data standardization system, standardization of the to-be-standardized data using the one or more standard representation terms identified for the plurality of groupings or clusters.

25. The non-transitory computer-readable memory of claim 24 wherein identifying one or more standard representation terms for the plurality of groupings or clusters comprises:
identifying a recommended term of the one or more recommended terms as a standard representation term of the one or more standard representation terms.

26. The non-transitory computer-readable memory of claim 24 wherein identifying one or more standard representation terms for the plurality of groupings or clusters comprises:
identifying a standard representation term of the one or more standard representation terms that is different from a recommended term of the one or more recommended terms.

27. The computer readable memory according to claim 24, wherein the identifying one or more recommended terms from terms in the plurality of groupings or clusters comprises identifying one or more recommended terms from terms in the plurality of groupings or clusters sharing a same variant.

28. The computer readable memory according to claim 24, wherein a standard representation term is a recommended term identified for the cluster or a term that is different from the recommended term and specified by a user.

29. The computer readable memory according to claim 24, wherein performing the standardization comprises replacing occurrences of terms in the cluster in the to-be-standardized data with a standard representation term for the cluster.

* * * * *

UNITED STATES PATENT AND TRADEMARK OFFICE
CERTIFICATE OF CORRECTION

PATENT NO. : 10,885,056 B2
APPLICATION NO. : 16/141244
DATED : January 5, 2021
INVENTOR(S) : Malak et al.

It is certified that error appears in the above-identified patent and that said Letters Patent is hereby corrected as shown below:

On the Title Page

On page 2, Column 2, item (56) under Other Publications, Line 7, delete "Xploiting" and insert -- Exploiting --, therefor.

On page 2, Column 2, item (56) under Other Publications, Line 32, delete "(Cioudera) & Tucu (Cioudera)," and insert -- (Cloudera) & Tucu (Cloudera), --, therefor.

On page 2, Column 2, item (56) under Other Publications, Lines 43-44, delete "http://sgoop.apache.org/docs/1.4.2/SgoopUserGuide.html," and insert -- http://sqoop.apache.org/docs/1.4.2/SqoopUserGuide.html, --, therefor.

On page 3, Column 1, item (56) under Other Publications, Line 36, delete "Efficeint" and insert -- Efficient --, therefor.

On page 3, Column 2, item (56) under Other Publications, Line 7, delete "Phytoiiogist," and insert -- Phytologist, --, therefor.

In the Specification

In Column 14, Line 63, delete "l" and insert -- 1 --, therefor.

In Column 15, Line 47, delete "st #, t #p," and insert -- st#, t#p, --, therefor.

In Column 15, Line 49, delete "nt #, t #p," and insert -- nt#, t#p, --, therefor.

In Column 23, Line 20, delete "R." and insert -- $R_n$. --, therefor.

In Column 32, Line 65, delete "computer readable" and insert -- computer-readable --, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*

In Column 33, Line 38, delete "Google) Glass®." and insert -- Google Glass®). --, therefor.

In the Claims

In Column 41, Line 21, in Claim 21, delete "computer readable" and insert -- computer-readable --, therefor.

In Column 41, Line 27, in Claim 22, delete "computer readable" and insert -- computer-readable --, therefor.

In Column 41, Line 32, in Claim 23, delete "computer readable" and insert -- computer-readable --, therefor.

In Column 41, Line 49, in Claim 24, delete "to be-standardized" and insert -- to-be-standardized --, therefor.

In Column 42, Line 42, in Claim 27, delete "computer readable" and insert -- computer-readable --, therefor.

In Column 42, Line 48, in Claim 28, delete "computer readable" and insert -- computer-readable --, therefor.

In Column 42, Line 53, in Claim 29, delete "computer readable" and insert -- computer-readable --, therefor.